US010015804B2

United States Patent
Krishna et al.

(10) Patent No.: US 10,015,804 B2
(45) Date of Patent: Jul. 3, 2018

(54) SYSTEM AND METHOD FOR PROVIDING CONTEXT-BASED ANTICIPATORY DYNAMIC RESOURCE RESERVATION

(71) Applicant: Aruba Networks, Inc., Sunnyvale, CA (US)

(72) Inventors: Navaneetha Krishna, Bangalore (IN); Brijesh Yadav, Bangalore (IN); Venkatesh Joshi, Bangalore (IN); Gopal Agarwal, Bangalore (IN)

(73) Assignee: ARUBA NETWROKS, INC., Sunnyvale, CA (US)

( * ) Notice: Subject to any disclaimer, the term of this patent is extended or adjusted under 35 U.S.C. 154(b) by 358 days.

(21) Appl. No.: 14/804,878

(22) Filed: Jul. 21, 2015

(65) Prior Publication Data

US 2017/0026980 A1 Jan. 26, 2017

(51) Int. Cl.
*H04W 72/10* (2009.01)
*H04L 12/851* (2013.01)
*H04W 28/26* (2009.01)

(52) U.S. Cl.
CPC ............ *H04W 72/10* (2013.01); *H04L 47/24* (2013.01); *H04W 28/26* (2013.01)

(58) Field of Classification Search
CPC .... H04W 72/10; H04W 28/26; H04L 12/851; H04L 47/24
USPC .................................................. 370/329, 331
See application file for complete search history.

(56) References Cited

U.S. PATENT DOCUMENTS

| 6,212,268 | B1* | 4/2001 | Nielsen | H04M 3/42195 370/352 |
| 6,728,365 | B1* | 4/2004 | Li | H04L 47/14 370/235 |
| 8,483,699 | B1* | 7/2013 | Oroskar | H04W 76/022 370/230 |
| 2004/0151292 | A1* | 8/2004 | Larsen | H04M 15/00 379/114.2 |
| 2005/0021849 | A1* | 1/2005 | Hipfinger | H04Q 3/0025 709/239 |
| 2006/0215600 | A1* | 9/2006 | Chen | H04W 88/08 370/328 |
| 2009/0311999 | A1* | 12/2009 | Sarkar | H04M 3/02 455/415 |

(Continued)

*Primary Examiner* — Maharishi Khirodhar
*Assistant Examiner* — Natali N Pascual Peguero
(74) *Attorney, Agent, or Firm* — Hewlett Packard Enterprise Patent Department

(57) ABSTRACT

Described herein are systems, devices, techniques and products for operating network devices, such as wireless access points, in a network environment. For example, wireless client devices may have resources reserved for their use by a network device if the wireless client device is categorized for such resource reservation, such as if the wireless client device is categorized as more important than other wireless client devices. Such categorization may be indicated by a context associated with the wireless client device, including belonging to or being associated with an important user or being used for an important purpose, such as emergency purposes, prescheduled purposes or involving multiple users. Reservation of wireless resources for wireless client devices may be performed to ensure an important user or device is provided with adequate resources to place a voice or video call, for example.

20 Claims, 15 Drawing Sheets

(56) References Cited

U.S. PATENT DOCUMENTS

2010/0246535 A1* 9/2010 Lindner .............. H04W 36/385
　　　　　　　　　　　　　　　　　　　　　370/332

* cited by examiner

SYSTEM AND METHOD FOR PROVIDING CONTEXT-BASED ANTICIPATORY DYNAMIC RESOURCE RESERVATION

CROSS REFERENCE TO RELATED APPLICATIONS

Not Applicable.

FIELD

The present disclosure generally relates to technologies for managing computer networks. Specifically, various techniques and systems are provided for managing network Quality of Services in wireless networks, such as wireless networks compliant with an Institute of Electrical and Electronics Engineers (IEEE) wireless networking standard, such as an IEEE 802.11 standard.

BACKGROUND

Network Quality of Service (QoS) requirements may vary depending on the application. For example, some network applications, such as two-way voice and video, have very stringent QoS requirements, which may include low latency and/or high bandwidth, in order to provide a good experience to the end users.

For both wired and wireless networks, bandwidth and latency may be impacted by network congestion. In general, wired networks may suffer from peak-hour network traffic issues to a lesser extent than wireless networks, in part due to the higher overall bandwidth availability for many wired network connections versus the overall bandwidth of a wireless network connection.

Various techniques are available for prioritizing network traffic on a wireless network to provide high QoS. For example, Call Admission Control (CAC) and Wi-Fi Multimedia (WMM) have been previously used to prevent network oversubscription and to prioritize certain types of network traffic.

SUMMARY

In some situations, it is desirable to provide an important network user with guaranteed QoS. For example, context may dictate that certain network data traffic must be allowed to pass to its destination, such as in emergency situations, regardless of the use of network resources by other users. User or device ranking and/or categorization may be used to establish a hierarchy for the order of preference/priority of wireless data traffic in order to guarantee service for certain wireless users or devices.

For example, calls to or from a doctor attending to a patient in an intensive care unit may be of sufficient importance that they are always prioritized and allowed. Similarly, emergency calls, such as 911 or E911 calls, may be of sufficient importance that they are always prioritized and allowed. Other scenarios may dictate that particular kinds of calls or users should be given priority network access, such as a business call from a senior executive to a customer, or calls which have been scheduled in advance. Additionally, calls that may involve a large number of parties, for example conference calls, may be given priority, such as due to the fact that call interruptions may impact multiple parties instead of just 1 or 2.

Categorization is optionally performed in real-time and/or in advance of the need for wireless resources in order to dynamically reserve wireless resources for categorized high-priority users and devices. For example, upon a wireless client device associating with a wireless access point, the wireless client device may be categorized as a high-priority device or a low-priority device, such as by using a look up table including identifiers, such as device identifiers or user identifiers. Such categorization is optionally performed at the time of association, on a periodic basis, or on an as-needed basis to determine what wireless resources should be reserved for the wireless client device. In this way, users and devices can be pre-identified as of high-priority so that, for example, calls placed by the user or device will not suffer QoS loss due to lack of wireless resources.

Optionally, categorization may be performed directly by the wireless access point that the wireless client device is associated with or may be performed by another device in network communication with the wireless access point, such as a network controller. Reservation of resources may also optionally be performed directly by the wireless access point that the wireless client device is associated with or may be performed by another device in network communication with the wireless access point, such as a network controller.

Further, to ensure that important wireless network data traffic is not dropped or delayed due to congestion, the use of wireless network resources by other users may be reduced on a dynamic basis and/or in real-time to provide for wireless resource availability for users or devices having a higher priority. For example, in one embodiment, if it is determined that lower priority devices are using too much wireless resources to ensure high availability of resources for the higher priority devices, the lower priority devices may have their bandwidth reduced, their data rate limited, or may be requested to transfer to another communications link, such as another access point or a wired connection, to a different subnet within the network, or to another communications network, such as a cellular network. In an extreme embodiment, a lower priority device may be disassociated from the wireless network and/or blacklisted to prevent reassociation for some time period to allow higher priority devices to have access to the wireless network resources.

As used herein, the phrases wireless resources and wireless network resources refer to information transmission capacity of a wireless network, such as may be provided between a wireless access point and one or more wireless client devices, which may be shared among all wireless client devices associated with a particular wireless access point. In some embodiments, wireless resources correspond to wireless bandwidth. As will be understood by the skilled artisan, wireless bandwidth may correspond to a capacity for transmission of data, which may be described in terms of bit rate (e.g., bits per second) or frame or packet rate (e.g., frames/packets per second). In some embodiments, wireless resources correspond to wireless throughput. As will be understood by the skilled artisan, wireless throughput may correspond to a rate at which network data is successfully transmitted, which may be described in terms of bit rate (e.g., bits per second) or frame or packet rate (e.g., frames/packets per second). In some embodiments, wireless resources correspond to wireless airtime. As will be understood by the skilled artisan, airtime may correspond to a time period for wireless transmission/reception by a particular wireless device. Amounts of wireless resources may be referred to herein in relative terms, such as percentages or fractions of a total amount of wireless resources, or may be referred to herein in absolute terms, such as bit rates or packet rates.

In a first aspect, provided are methods, such as computer implemented methods. Computer implemented methods of this aspect may be performed by network devices, such as an access point (e.g., a wireless access point compliant with an Institute of Electrical and Electronics Engineers (IEEE) 802.11 standard) or another network device, such as a network controller or gateway device, which may, for example, be compliant with an IEEE 802.11 or 802.3 standard.

In a specific embodiment, a method of this aspect comprises categorizing, by a network device, a wireless client device associated with the network device into a category; determining a reserve amount of wireless resources to reserve for wireless calls placed by wireless client devices in a high-priority category, for example where the reserve amount of wireless resources includes an amount of wireless resources needed for all wireless client devices in the high-priority category to place wireless calls; determining a threshold amount of wireless resources available for use by wireless client devices in a low-priority category, such as a threshold amount that is determined using the reserve amount; monitoring an actual amount of wireless resources used by wireless client devices in the low-priority category; determining that the actual amount exceeds the threshold amount; and reducing the actual amount of wireless resources used by wireless client devices in the low-priority category to below the threshold amount. In embodiments, categories are associated with priorities. In embodiments priorities include high priorities and low priorities. Optionally, the network device is a wireless access point compliant with an IEEE 802.11 specification. Optionally, one or more wireless client devices are compliant with an IEEE 802.11 specification.

Various techniques are useful for categorizing a wireless client. Optionally, categorizing a wireless client device may include receiving a category indicator for the wireless client device that may be determined by another network device. Categorizing wireless clients into high-priority categories and low-priority categories is useful for providing preferential network access to specific wireless client devices when, for example, context dictates that the specific wireless client device's network transmissions should or must be delivered. For example, in one embodiment, categorizing includes analyzing a context associated with the wireless client device. Optionally, categorizing includes identifying that the wireless client device is associated with an identity or a group pre-established as belonging to the high-priority category. In one embodiment, for example, categorizing includes comparing an identifier for the wireless client device with a list of identifiers pre-established as belonging to the high-priority category. In an exemplary embodiment, a wireless client devices that is categorized in the high-priority category corresponds to a high-priority wireless voice client or high-priority wireless video clients. In an exemplary embodiment, a wireless client device that is categorized in the low-priority category correspond to low-priority wireless voice clients, low-priority wireless video clients, or low-priority wireless data clients.

Optionally, a type of network service being requested by a wireless client device may dictate that the wireless client device should be provided with priority network access. For example, in one embodiment, categorizing includes identifying that the wireless client device is placing a wireless emergency call. Identifying that a wireless call is an emergency call can be achieved, in embodiments, by performing deep packet inspection and or through network communications with another network device, such as a voice or video gateway. Alternatively or additionally, wherein categorizing includes identifying that the wireless client device is placing a wireless conference call. Identifying that a wireless call is a conference call can be achieved, in embodiments, by performing deep packet inspection and or through network communications with another network device, such as a voice or video gateway. Alternatively or additionally, categorizing includes identifying that the wireless client device is placing a pre-scheduled wireless call. Identifying that a pre-scheduled wireless call is being place can be achieved, in embodiments, by tracking or analyzing calendar or schedule information.

In embodiments, upon determining that the actual amount of wireless resources used by low-priority category wireless client devices exceeds a threshold amount, the actual amount of wireless resources used may be reduced. Various techniques are contemplated for reducing the actual amount of wireless resources used and virtually any technique may be utilized in various embodiments. In one embodiment, reducing includes limiting a data rate of a low-priority category wireless client device. In one embodiment, reducing includes limiting a bandwidth of a low-priority category wireless client device.

Optionally, reducing includes facilitating a handoff of a low-priority category wireless client device. For example, in one embodiment, reducing includes facilitating a fast basic service set transition of a low-priority category wireless client device. Optionally, reducing includes transmitting a basic service set transition management request. In a specific embodiment, reducing includes transmitting a basic service set transition management request, and wherein receiving the basic service set transition management request at a low-priority category wireless client device facilitates a handoff of the low-priority category wireless client device. Optionally, reducing includes transmitting a list of neighboring network devices, such as where neighboring network devices of the list correspond to additional network devices in wireless communication range of the network device. Neighbor lists, basic service set transition management messages and fast basic service set transitions are described in detail in the 802.11v and 802.11r amendments to the IEEE 802.11 standard, and will be understood by the skilled artisan.

In one embodiment, reducing includes disassociating a low-priority category wireless client device. Such an embodiment, however, may not be preferable, as this may result in a complete loss of network service for the disassociated wireless client device. Further, the low-priority category wireless client device may attempt to reassociate with the network device. Optionally, an identifier for a disassociated wireless client device may be added to an ignore list. Optionally, this information may be communicated to the disassociated wireless client device, which may result in the disassociated wireless client device, at least temporarily, stopping data transmissions or attempted data or association transmissions with the network device.

In some embodiments, wireless client devices may have access to alternative network connections, such as wired network connections or additional wireless network connections, that may be able to service the wireless client device's data transmissions. Optionally, reducing includes transmitting a request that a low-priority category wireless client device transfer data transmissions to an alternative network connection. In this way, the data connections can be offloaded from the network onto another network, at least temporarily, and reduce the actual amount of wireless resources being consumed. As will be understood by the skilled artisan, networks may include data connections that are wired and data connections that are wireless. As such, a wireless network may incorporate wireless connections, such as between an access point and a wireless client device, and wired connections, such as between an access point and a switch, gateway, or router, for example.

In embodiments, amounts of wireless resources may be reserved for use by high-priority category wireless client devices. As used herein, reserved resources correspond to wireless resources that are set aside or otherwise taken out of general use by any or all network devices and held for use by one or more particular network devices. Reserved wireless resources can remain used or unused, depending on a particular configuration of active data transmissions by the device(s) the wireless resources are being reserved for. Wireless resources may be reserved on a per-wireless client basis or on a priority or category basis for all wireless client devices within a particular priority and/or category. Various amounts of resources may be reserved for a particular wireless client, priority or category, depending on the network application. In some embodiments, a reserved amount of resources corresponds to an amount of wireless resources needed for a wireless voice call and/or a wireless video call. Optionally, determining the reserve amount of wireless resources includes identifying an amount of wireless resources for a wireless voice call or a wireless video call. In some embodiments, a reserved amount of resources corresponds to an amount of wireless resources so that a wireless voice call and/or wireless video call can experience good call quality or high quality of service. In some embodiments, an amount of wireless resources needed to provide good call quality or high quality of service corresponds to an amount of wireless resources so that a wireless voice call or a wireless video call does not experience noticeable or detrimental call interruptions. In some embodiments, a noticeable or detrimental call interruption corresponds to an interruption (loss of voice/video) having some time duration or introducing some delay into a voice/video call. For example, calls that experience good call quality and/or high quality of service may have interruptions or delays that do not exceed 50 ms in length, 100 ms in length, 150 ms in length, etc.

From the perspective of the network device, the network device may need to reserve resources for one or a plurality of wireless client devices, depending on the particular scenario. In one embodiment, determining the reserve amount of wireless resources includes identifying a number of wireless client devices in the high-priority category. If resources to reserve per client are fixed, computation of the amount to reserve may optionally be performed by multiplication of the number of clients with the amount to reserve per client. Optionally, determining the reserve amount of wireless resources includes identifying an amount of resources to reserve for each of the associated wireless client devices in the high-priority category. If resources to reserve per client are different, computation of the amount to reserve may optionally be as straightforward as summing the different amounts to reserve for each client.

In embodiments, a threshold level is used to determine when resources need to be freed up in order to reserve resources for high-priority wireless client devices. Use of threshold values allows for a comparison between the threshold value and a resource amount to determine whether resources are needed or are available. In some embodiments, determining the threshold amount of wireless resources includes determining a total amount of wireless resources and computing a difference between the total amount of wireless resources and the reserve amount. Optionally, the reserve amount includes an additional amount of wireless resources needed for a low-priority category wireless client device to place a wireless call when the low-priority category wireless client device is recategorized into the high-priority category. Optionally, the reserve amount or threshold amount can be recalculated each time a new devices associates with or disassociates from the network device. In this way, resources can continuously be made available for unexpected high-priority users or uses, such as emergency calls.

In other aspects, systems are provided, such as systems for achieving and/or performing the methods described herein. In exemplary embodiments, a system of this aspect comprises one or more processors and a non-transitory computer readable storage medium communicatively coupled or otherwise positioned in data communication with the one or more processors. Optionally, a system of this aspect further comprises one or more network transceivers coupled with the one or more processors, such as one or more wireless network transceivers. Useful wireless network transceivers include those compliant with an IEEE 802.11 specification. In embodiments, the non-transitory computer readable storage medium includes instructions that, when executed by the one or more hardware processors, cause the one or more hardware processors to perform one or more of the methods described herein.

For example, in a specific embodiment, a system of this aspect comprises one or more processors, and a non-transitory computer readable storage medium coupled with the one or more processors and including instructions that, when executed by the one or more processors, cause the one or more processors to perform operations including various steps of the method embodiments described above.

In other aspects, computer program products are provided, such as computer program products configured to achieve and/or perform methods described herein. In exemplary embodiments, a computer program product of this aspect is a non-transitory computer readable storage medium comprising instructions that, when executed by one or more hardware processors, cause the one or more hardware processors to perform one or more of the methods described herein.

For example, in a specific embodiment, a computer program product of this aspect comprises a non-transitory computer readable storage medium comprising instructions that, when executed by one or more processors, cause the one or more processors to perform operations including various steps of the method embodiments described above.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

Illustrative embodiments of the present invention are described in detail below with reference to the following drawing figures.

DETAILED DESCRIPTION

Figure 1:
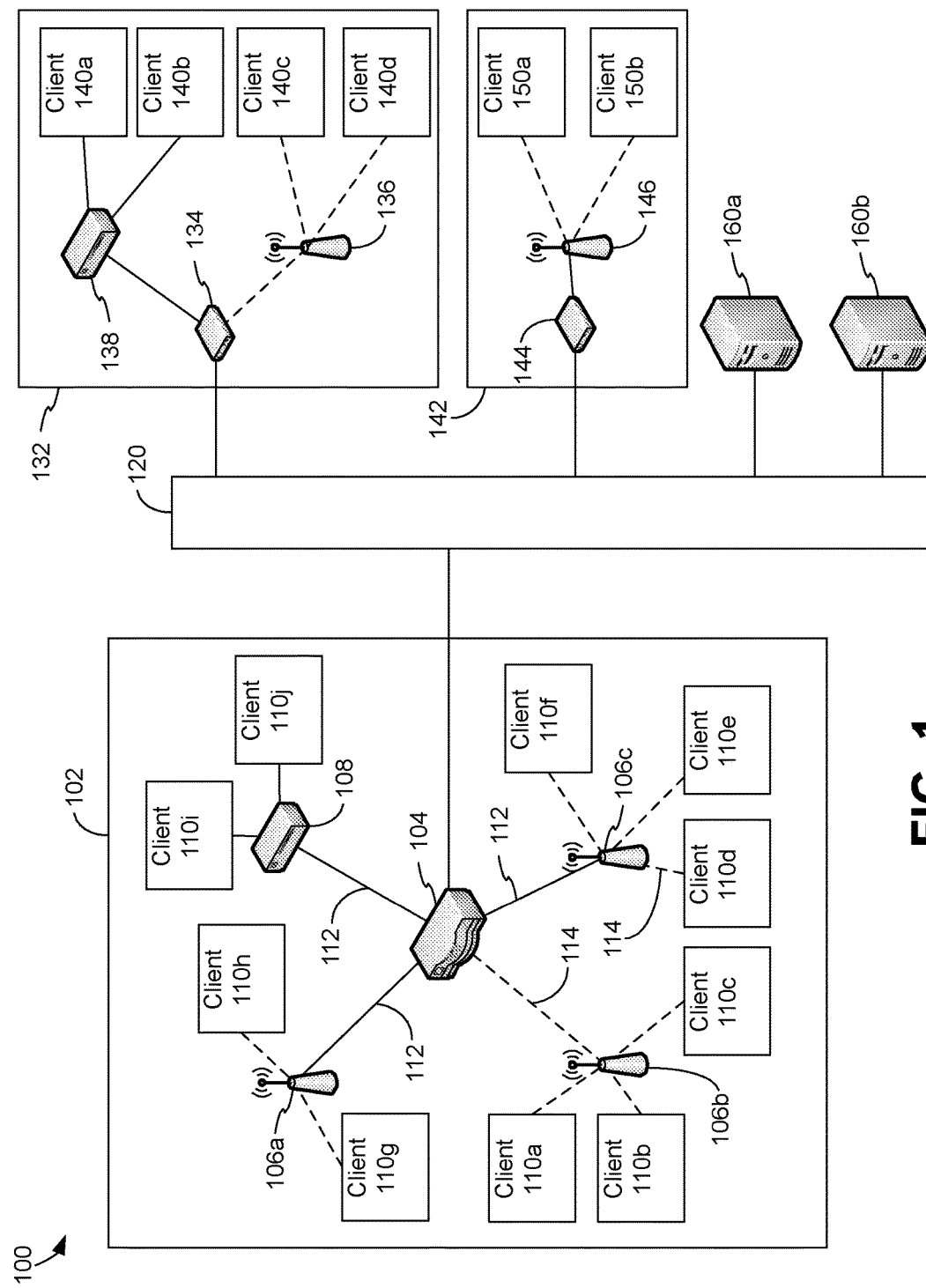
FIG. 1 illustrates a network configuration in accordance with some embodiments.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, an algorithm, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

FIG. 1 illustrates one embodiment of a network configuration 100 that may be implemented for a multi-user organization, such as a business, educational institution, governmental entity, or any other organization having multiple users and possibly multiple physical or geographical sites. The network configuration 100 may include a main office 102 in communication with a network 120. The network configuration 100 may also include one or more remote sites 132, 142, also in communication with the network 120.

The main office 102 may include a primary network, possibly also called a corporate network, enterprise network, or a home network. The main office 102 network may be a private network. A private network is a network that may include security and access controls, such that only authorized users may access the private network. Authorized users may include, for example, employees of a company located in the main office 102.

In the illustrated embodiment, the main office 102 includes a controller 104 in communication with the network 120. The controller 104 may provide communication with the network 120 for the main office 102, though it may not be the only point of communication with the network 120 for the main office 102. A single controller 104 is illustrated, though the main office may include multiple controllers and/or multiple communication points with network 120. In some embodiments, the controller 104 communicates with the network 120 through a router (not illustrated). In other embodiments, the controller 104 functions as a router for the devices in the main office 102.

A controller 104 may be any device that is operable to configure and manage network devices, such as in the main office 102, and may also manage network devices at the remote sites 132, 142. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless access points 106a, 106b, and 106c. Switch 108 and wireless access points 106a-106c provide network connectivity to various client devices 110a, 110b, 110c, 110d, 110e, 110f, 110h, 110i, and 110j. Using a connection to switch 108 or access point 106a-106c, a client device 110a-110j is able to access network resources, including other devices on the network and the network 120.

Client devices 110a-110j include any hardware device that includes processing circuitry running at least one process adapted to control the flow of traffic to and/or from the device. Client devices may also include user input and output interfaces and communication interfaces, such as a radio for wireless communication and/or a physical connector for wired communication. Examples of client devices include, but are not limited to: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, netbook computers, televisions and similar monitors, content receivers, set-top boxes, personal digital assistants (PDAs), mobile phones, smart phones, smart terminals, dumb terminals, virtual terminals, video game consoles, printers, and the like.

Within the main office 102, a switch 108 is included as one example of a point of access to the network for wired client devices 110i and 110j. Client devices 110i and 110j may connect to the switch 108 and, through the switch 108, may be able to access other devices within the network configuration 100. The client devices 110i and 110j may also be able to access the network 120, through the switch 108. The client devices 110i and 110j may communicate with the switch 108 over a wired connection 112. In the illustrated example, the switch 108 communicates with the controller 104 over a wired connection 112, though this connection may also be wireless.

Wireless access points 106a-106c are included as another example of a point of access to the network for client devices 110a-110h. An access point 106a-106c is a combination of hardware, software, and/or firmware that is configured to provide wireless network connectivity to wireless client devices 110a-110h. In the illustrated embodiment, the access points 106a-106c can be managed and configured by the controller 104. The access points 106a-106c communicate with the controller 104 over either a wired connection 112 or a wireless connection 114.

Client devices within a network (e.g. wireless local area networks, or "WLANs") communicate with access points in order to obtain access to one or more network resources. An access point, also referred to herein as an "AP", may include a digital device that operates as a gateway for a client device to establish a connection (e.g., a communicative coupling) with one or more networks (e.g., the Internet, an intranet, a local area network, etc.). For example, an access point may be implemented as a wireless access point (WAP), which is configured to communicate wirelessly with one or more client devices as well as communicate with other network devices associated with the one or more networks, such as a controller, router or a switch, for example, through a wired or wireless connection.

The network configuration 100 may include one or more remote sites 132, 142. A remote site 132 may be located in a different physical or geographical location from the main office 102. In some cases, the remote site 132 may be in the same geographical location, or possibly the same building, as the main office, 102, but may lack a direct connection to the network located within the main office 102, relying instead on a connection over network 120. A remote site 132 such as the one illustrated may be, for example, a satellite office. The remote site 132 may include a gateway device 134 for communicating with the network 120. A gateway device 134 may be a router, a digital-to-analog modem, a cable modem, a Digital Subscriber Line (DSL) modem, or some other network device configured to communicate with the network 120. The remote site 132 may also include a switch 138, router, and/or access point 136 in communication with the gateway 134 over either wired or wireless connections. The switch 138, router and access point 136 provide connectivity to the network for various client devices 140a, 140b, 140c, and 140d.

In various embodiments, the remote site 132 is in direct communication with main office 102, such that client devices 140a-140d at the remote site 132 access the network resources at the main office 102 as if these clients 140a-140d were located at the main office 102. In such embodiments, the remote site 132 is managed by the controller 104 at the main office, and the controller 104 provides the necessary connectivity, security, and accessibility that enable communication between the remote site 132 and the main office 102. Once connected to the main office 102, the remote site 132 may function as a part of a private network provided by the main office 102.

In various embodiments, the network configuration 100 may include one or more smaller remote sites 142, comprising only a gateway device 144 for communicating with the network 120 and a wireless access point 146, by which various client devices 150a and 150b access the network 120. Such a remote site 142 may represent, for example, an individual employee's home or a temporary remote office. The remote site 142 may also be in direct communication with the main office 102, such that the client devices 150a and 150b at remote site 142 access network resources at the main office 102 as if client devices 150a and 150b were located at the main office 102. The remote site 142 may be managed by the controller 104 at the main office 102 to make this transparency possible. Once connected to the main office 102, the remote site 142 may function as a part of a private network provided by the main office 102.

The network 120 may be a public network, such as the Internet. A public network is a network that may be shared by any number of entities, including the illustrated network configuration 100. A public network may have unrestricted access, such that any user may connect to it. The network 120 may include any number of intermediate network devices, such as switches, routers, gateways, servers, and/or controllers, that are not directly illustrated as part of the network configuration 100 but that facilitate communication between the various parts of the network configuration 100, and between the network configuration 100 and other network-connected entities. The network 120 may include various content servers 160a and 160b. Content servers 160a and 160b may include various providers of multimedia downloadable and/or streaming content, including audio, video, graphical, and/or text content, or any combination thereof. Examples of content servers 160a and 160b include, for example, web servers, streaming radio and video providers, and cable and satellite television providers. The client devices 110a-110j, 140a-140d, and 150a-150b may request and access the multimedia content provided by the content servers 160a and 160b.

Figure 2:
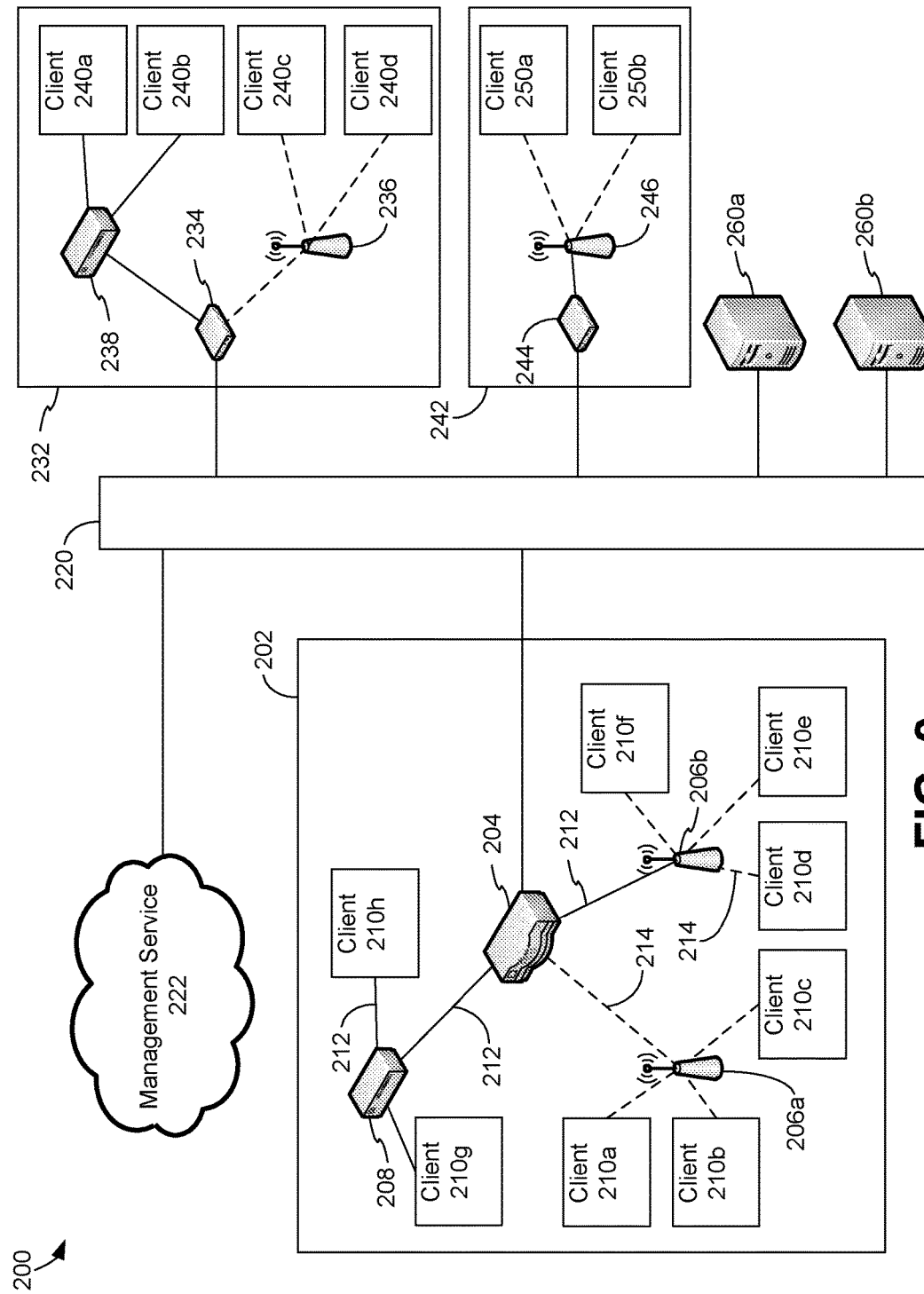
FIG. 2 illustrates a network configuration in accordance with some embodiments.

FIG. 2 illustrates an embodiment of a network configuration 200 that includes a cloud-based management service 222. The network configuration 200 may be implemented for a multi-user organization. The network configuration 200 includes a main office 202 in communication with a network 220, and may also include one or more remote sites 232, 242, also in communication with the network 220. In the illustrated embodiment, the main office 202 includes a gateway device 204, such as a router, for communicating with the network 220. A single gateway device 204 is illustrated, though the main office 202 may include multiple gateway devices and/or multiple communication points with the network 220.

The gateway device 204 may be in communication with one or more switches 208 and/or wireless access points 206a and 206b. Switch 208 and access points 206a and 206b provide network connectivity to various client devices 210a, 210b, 210c, 210d, 210e, 210f, 210g, and 210h. Using a connection to switch 208 or access points 206a, 206b, a client device 210a-210h is able to access network resources, including other devices on the network and the network 220.

A switch 208 is included as an example of a point of access to the network for client devices 210g-210h. Client devices 210g-210h may communicate with the switch 208 over a wired connection 212. Wireless access points 206a-206b are included as another example of a point of access to the network for client devices 210a-210f. Client devices 210a-210f may communicate with the access points 206a-210b over wireless connections 214. The access points 206a-b may themselves communicate with the gateway device 204 over either wired connections 212 or wireless connections 214.

In the embodiment illustrated, the network configuration 200 includes a cloud-based management service 222. The management service 222 may include various software and software processes for configuring and/or managing network devices at the main office 202. Management tasks may include, for example, access, authentication, security, hardware management, configuration and set-up, and/or internal and/or external communication. The management service 222 may be running on a server local to the main office 202, or a server located remotely from the main office 202, or may be distributed across any number of local and/or remote servers. In embodiments where the management service 222 is located remote to the main office 202, the management service 222 may access the main office 202 over the network 220 or by way of gateway device 204.

The network configuration 200 may include one or more remote sites 232, 242. A remote site 232 may include a gateway device 234 for communicating with the network 220. The remote site 232 may also include a switch 238, router, and/or access point 236 in communication with the gateway device 234 over either wired or wireless connections. The switch 238 and access point 236 provide connectivity to the network 220 for various client devices 240a, 240b, 240c, and 240d.

In various embodiments, the remote site 232 may be configured and/or managed by the management service 222, such that client devices 240a-240d at the remote site 232 access the network resources at the main office 202 as if these clients 240a-240d were located at the main office 202.

The management service 222 provides all, or parts of, the necessary connectivity, security, and accessibility that enable communication between the remote site 232 and the main office 202.

In various embodiments, the network configuration 200 may also include one or more smaller remote sites 242, comprising only a gateway device 244 for communicating with the network 220 and a wireless access point 246, by which various client devices 250a and 250b access the network 220. The remote site 242 may also be configured and/or managed by the management service 222, such that the client devices 250a-250b at the remote site 242 access network resources at the main office 202 as if these client devices 250a-250b were located at the main office 202. The management service's 222 control over the remote site 242 makes this transparency possible.

The network 220 may be a public network, such as the Internet. The network 220 may include various content servers 260a and 260b. The client devices 210a-210h, 240a-240d, 250a-250b may request and access data and content provided by the content servers 260a-260b over their connection to the network 220.

FIG. 3A, FIG. 3B, FIG. 3C, FIG. 3D, FIG. 3E, FIG. 3F, and FIG. 3G illustrate an exemplary network configuration 300, according to embodiments of the present technology. Specifically, illustrated in FIGS. 3A-3G is an example showing a variety of network devices 302, 304, and 306, a variety of wireless access points 308, 310, 312, and 314, and a variety of wireless client devices 316, 318, 320, 322, 324, and 326 in network communication with network 330. Network devices 302, 304, and 306 may, for example, represent switches, hubs, routers, and/or the like. Wireless client devices 316, 318, 320, 322, 324, and 326 are illustrated in wireless association with a wireless access point by dashed lines.

Figure 3A:
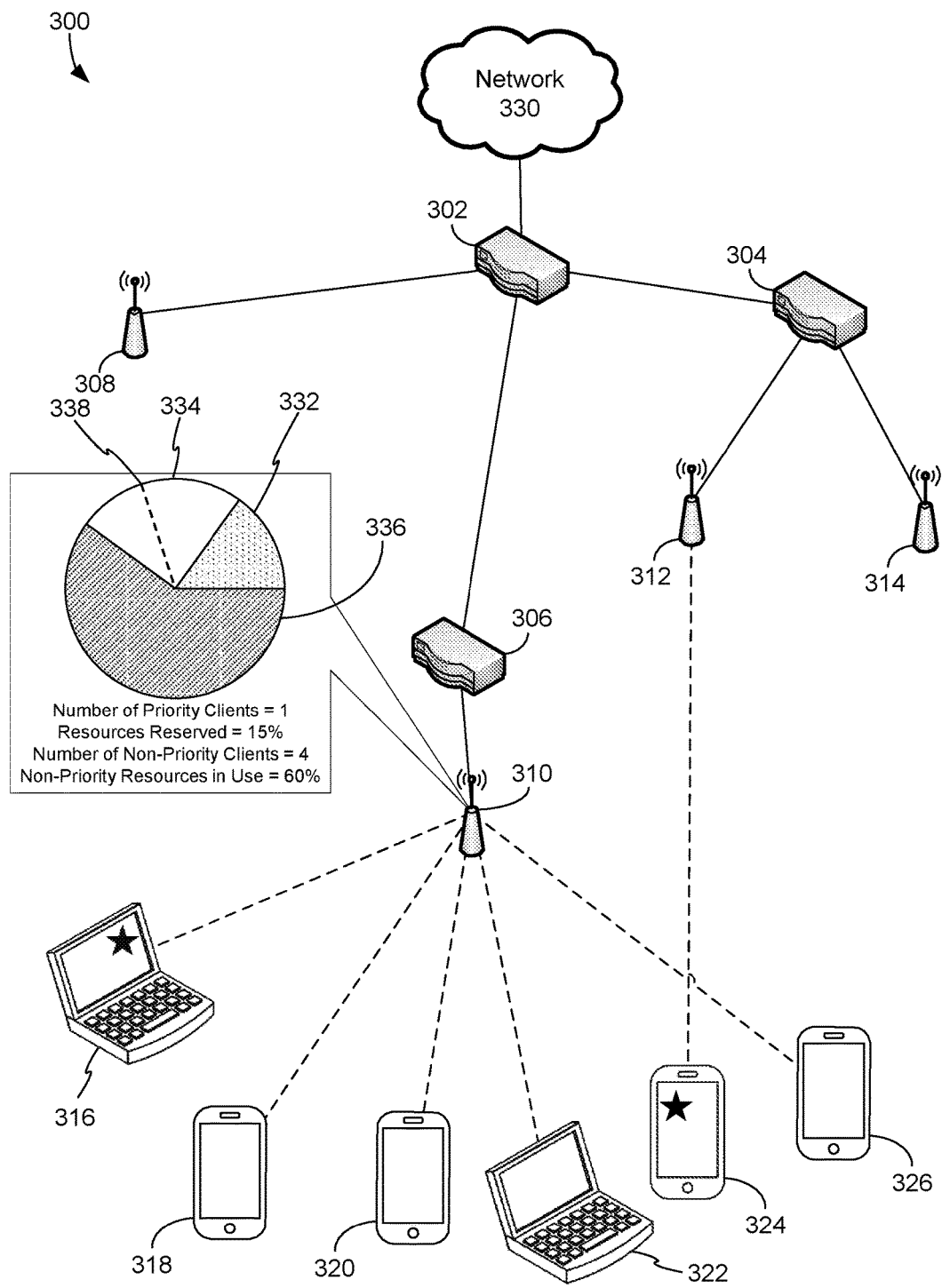
FIG. 3A illustrates a network configuration in accordance with some embodiments.

In FIG. 3A, which may, for example, represent an initial arrangement for network configuration 300, wireless client devices 316, 318, 320 and 326 are illustrated in wireless association with wireless access point 310 and wireless client device 324 is illustrated in wireless association with wireless access point 312. Wireless client devices 316 and 324 are categorized in a high-priority category, and are designated as such in the figure by a star.

The caption for wireless access point 310 indicates that one high-priority category client is associated with access point 310, that 15% of the wireless resources are reserved for the high-priority category client, that four low-priority category clients are associated with access point 310 and that the low-priority category clients are using 60% of the wireless resources. A pie chart in the caption also illustrates this information graphically and shows the reserved resources 332, the free resources 334, the resources in use 336 by low-priority category clients and a threshold level indicator 338. In the embodiment illustrated, the threshold level is set to allow for 15% of the resources remaining as free/unused.

Figure 3B:
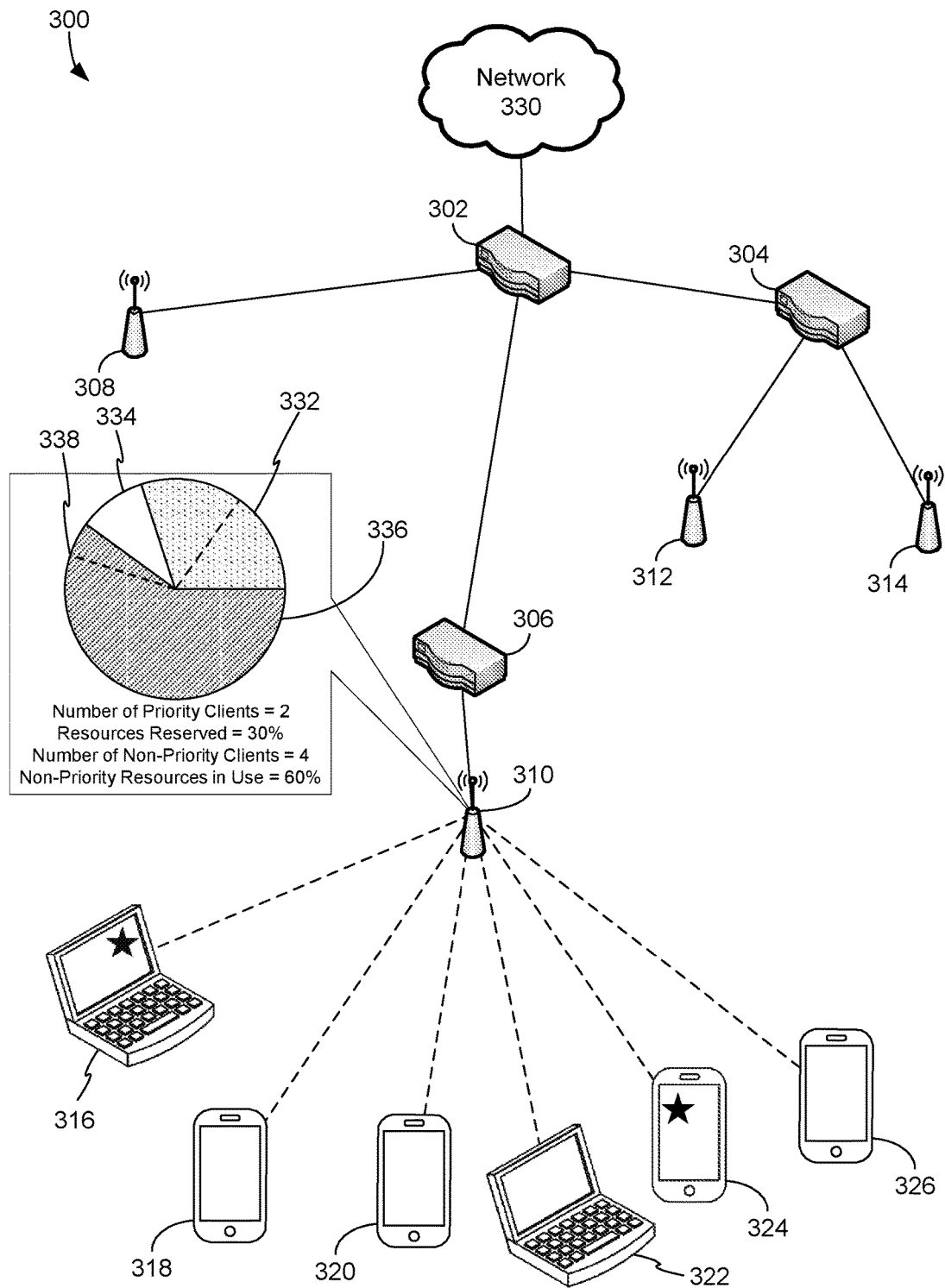
FIG. 3B illustrates a network configuration in accordance with some embodiments.

FIG. 3B illustrates the situation where wireless client device 324 roams from wireless access point 312 to wireless access point 310. Here, as indicated in the caption for wireless access point 310, the number of high-priority category clients has increased from one to two, with the reserved resources 332 increasing to 30%. Further, the threshold level 338 is shifted and now falls within the resources in use 336 by low-priority category clients, which remains at 60%, indicating that resources in use 336 by low-priority category clients must be reduced in order to have the free resources 334 remain at acceptable levels. A variety of techniques are contemplated for reducing resources in use 336 by low-priority category clients.

Figure 3C:
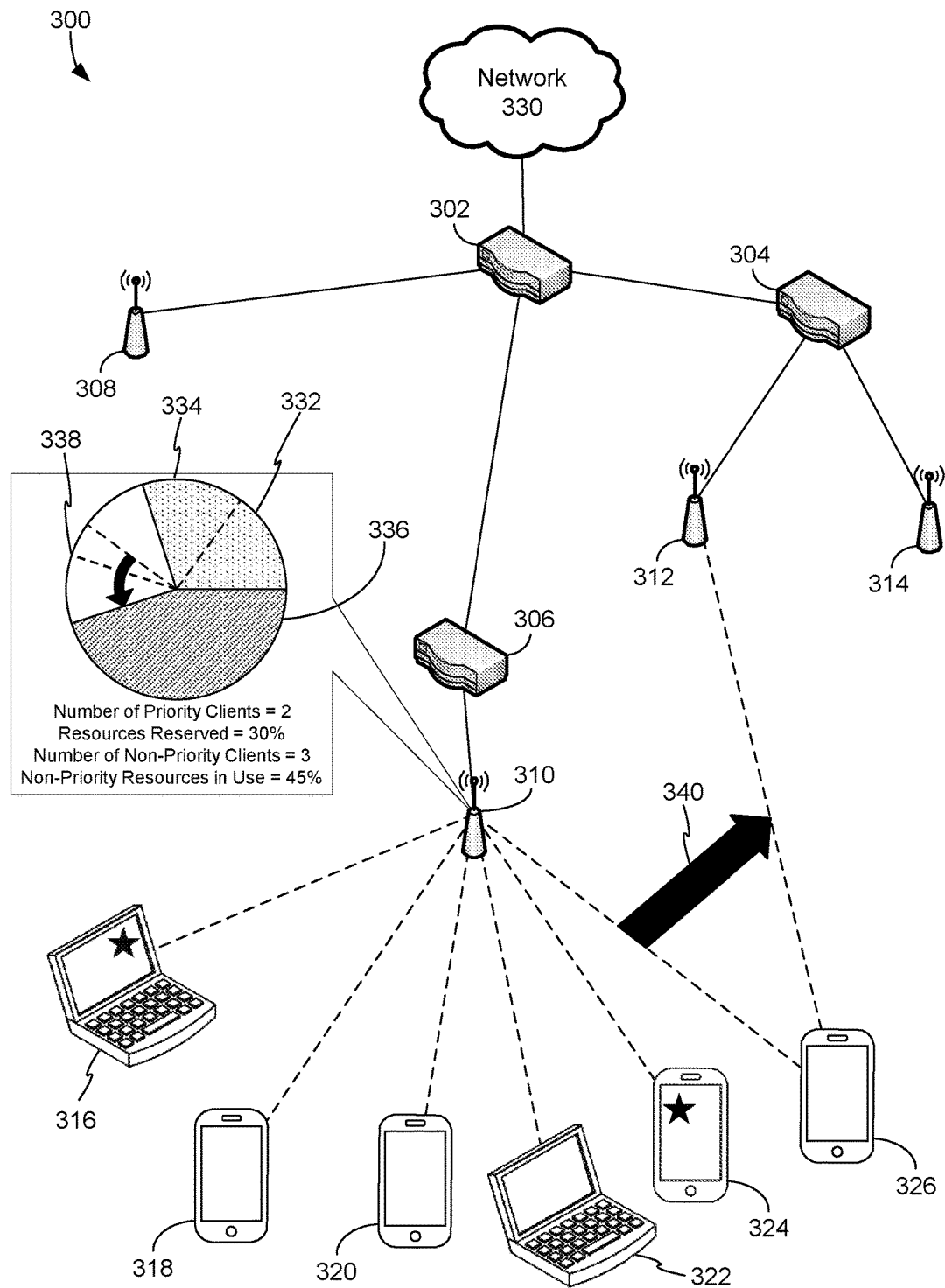
FIG. 3C illustrates a network configuration in accordance with some embodiments.

FIG. 3C illustrates a first example for reducing resources in use 336 by low-priority category clients and involves handoff of a low-priority category wireless client to another wireless access point. For example, as illustrated, wireless client device 326 is shown as initiating a handoff 340 to wireless access point 312. Wireless client device 326 may initiate handoff 340 in response to a message received at wireless client device 326 from wireless access point 310. For example, wireless access point 310 may transmit a basic service set (BSS) transition management request, such as described by the IEEE 802.11v amendment to the IEEE 802.11 standard.

In some embodiments, a wireless client device may initiate a fast BSS transition, such as described by the IEEE 802.11r amendment to the IEEE 802.11 standard. Use of a fast BSS transition is advantageous as the handoff takes place quickly, such as within 50 ms, and may provide limited service interruption to the wireless client device. The skilled artisan will appreciate the time and data transmission savings achieved by 802.11r compliant fast BSS transitions. Such a quick transition is desirable for handoff of wireless client devices engaged in a voice or video call.

Upon handoff 340 of wireless client device 326, the number of low-priority category clients associated with wireless access point 310 reduces to three, with a corresponding reduction in the resources in use 336 by low-priority category clients, as wireless client device 326 begins to use wireless resources from access point 312 after the handoff 340.

Figure 3D:
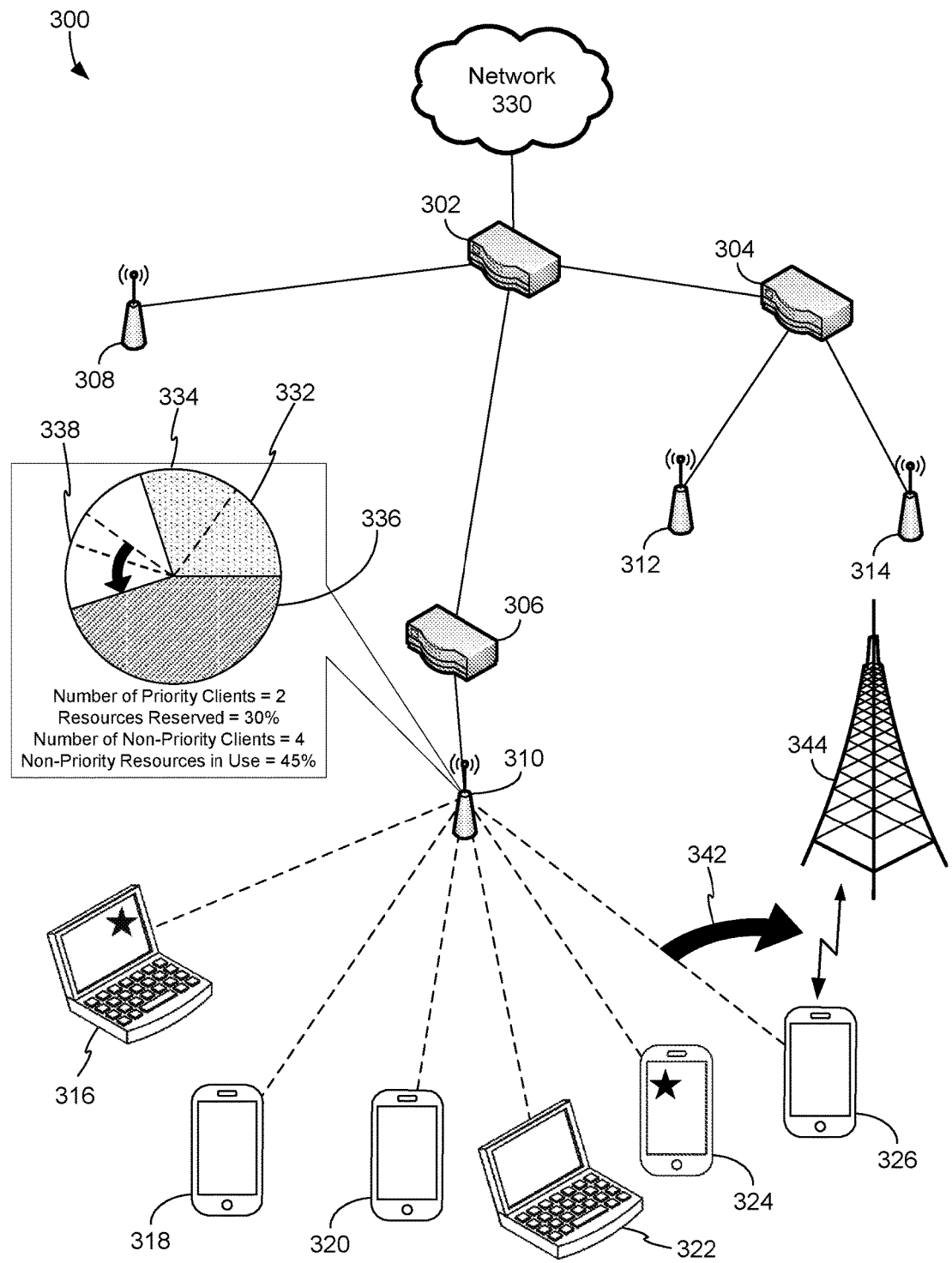
FIG. 3D illustrates a network configuration in accordance with some embodiments.

FIG. 3D illustrates a second example for reducing resources in use 336 by low-priority category clients and involves transitioning 342 data services of a low-priority category wireless client to another network connection. For example, as illustrated, wireless client device 326 is shown as transitioning 342 its network communications from wireless access point to cellular network 344. Optionally, wireless client device 326 may disassociate from wireless access point 310. As illustrated in FIG. 3D, however, wireless client device 326 remains associated with wireless access point 310. Wireless client device 326 may initiate such a transition 340 in response to a message received at wireless client device 326 from wireless access point 310. For example, wireless access point 310 may transmit a request that wireless client device 326 limit use of wireless resources from access point 310 and instead use network resources of an alternative network connection available, which may include a wired network connection or a wireless or cellular network connection. Upon transitioning 342 network communications to cellular network 344, the number of low-priority category clients associated with wireless access point 310 remains at four, but a reduction in the resources in use 336 by low-priority category clients is observed.

Figure 3E:
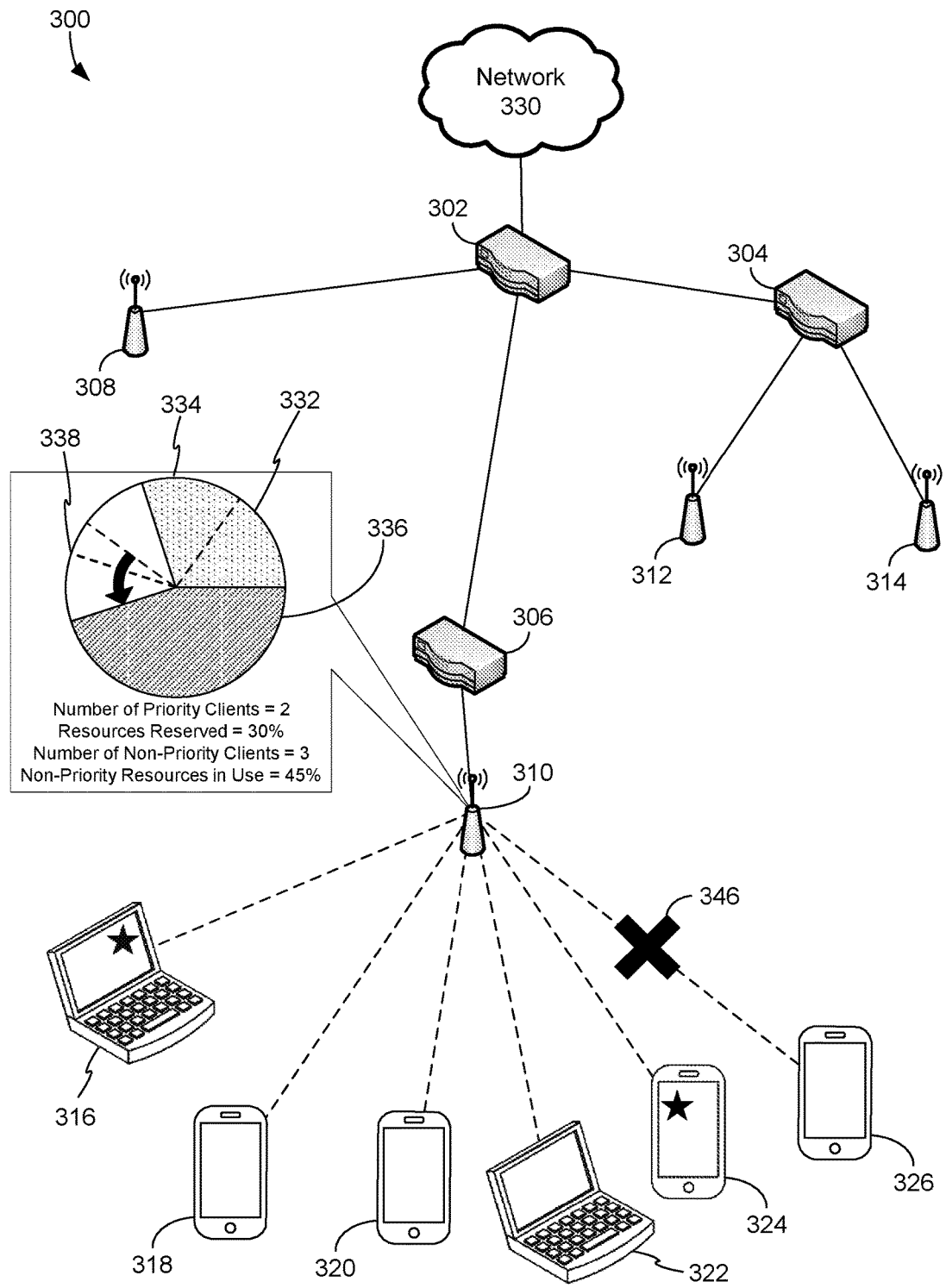
FIG. 3E illustrates a network configuration in accordance with some embodiments.

FIG. 3E illustrates a third example for reducing resources in use 336 by low-priority category clients and involves disassociating 346 a low-priority category wireless client. For example, as illustrated, wireless client device 326 is shown as having its wireless association terminated, such as by receiving a disassociation frame or a deauthentication frame. In such a situation wireless client device 326 no longer remains associated with wireless access point 310. Upon disassociating 346 wireless client device 326, the number of low-priority category clients associated with wireless access point 310 is reduced to three, with a corresponding reduction in the resources in use 336 by low-priority category clients.

Figure 3F:
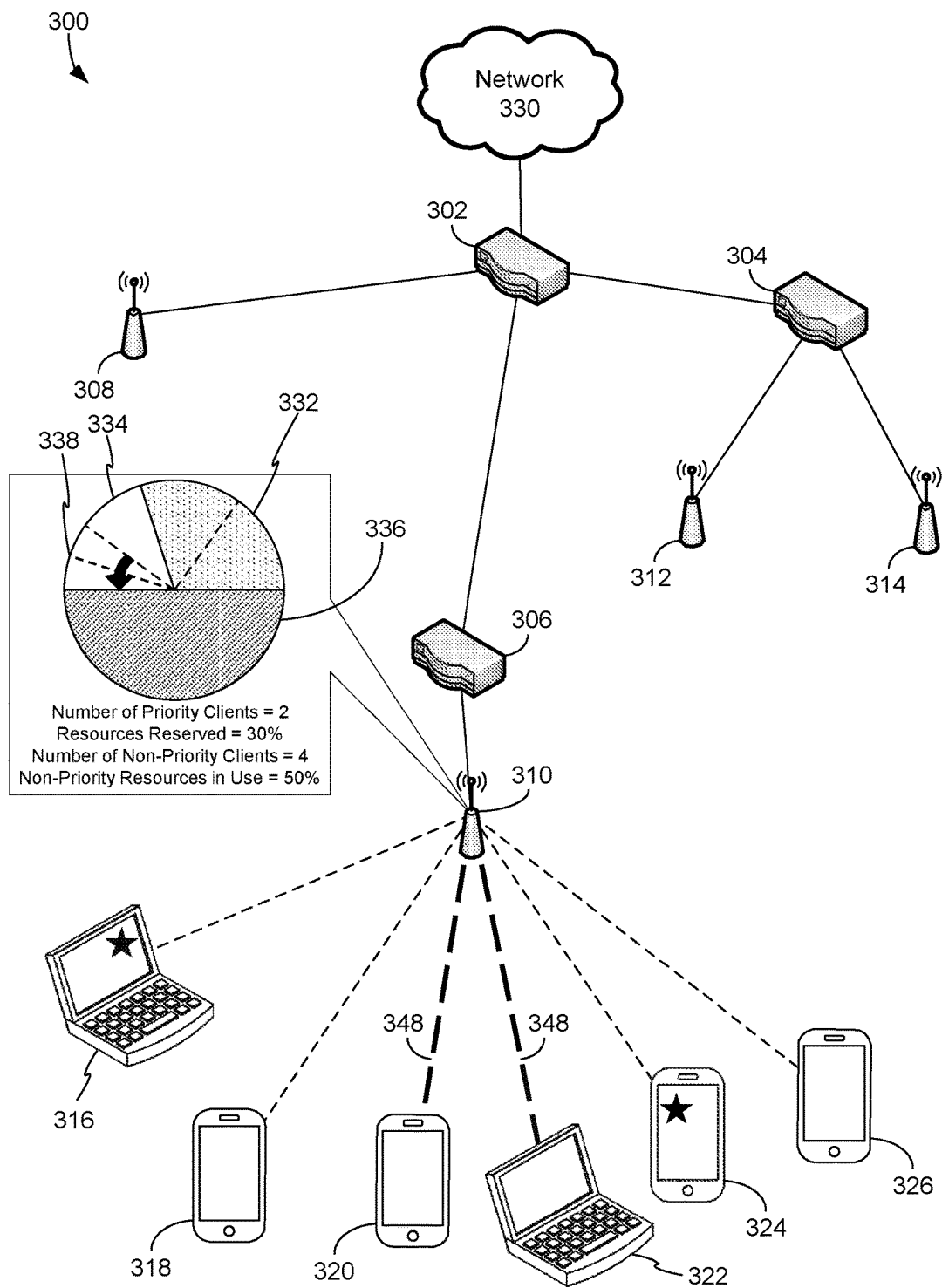
FIG. 3F illustrates a network configuration in accordance with some embodiments.

FIG. 3F illustrates a fourth example for reducing resources in use 336 by low-priority category clients and involves throttling 348 one or more low-priority category wireless clients. For example, as illustrated, wireless client devices 320 and 322 are shown as having a data rate of their wireless network connections reduced. Throttling 348 may be achieved by a number of techniques, including reducing a data rate of an associated client device, reducing or limiting a bandwidth or throughput of an associated client device, etc. In some embodiments, the throttled client devices may experience a reduction in quality of service and/or some level of network interruption due to the reduction in data rate. However, this may be required to reserve suitable resources for high-priority category wireless clients 316 and 324. As illustrated, throttling 348 wireless client devices 320 and 322 results in a reduction of resources in use 336 by low-priority category clients.

Figure 3G:
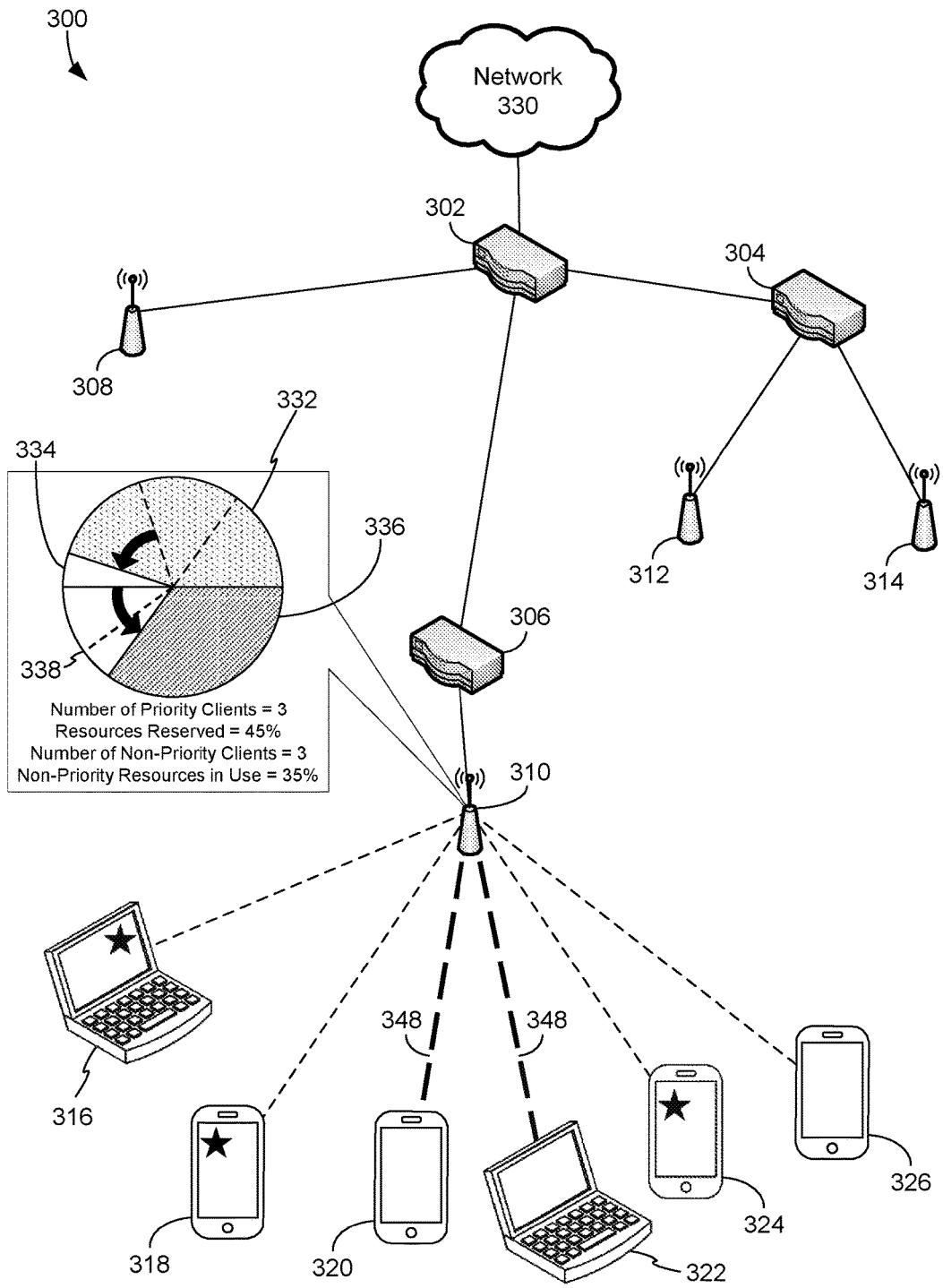
FIG. 3G illustrates a network configuration in accordance with some embodiments.

In some embodiments, low-priority category wireless clients may become high-priority category wireless clients, such as in the event a low-priority category wireless client places an emergency call, a scheduled call, a conference call, registers as associated with a high-priority category user, etc. FIG. 3G illustrates a further example, based on FIG. 3F, where wireless client device 318 is recategorized as a high-priority category client device. As illustrated in the caption for access point 310, three high-priority category wireless clients are associated with access point 310, including wireless client device 318, and three low-priority category wireless clients are associated with access point 310. A decrease in resources in use 336 by low-priority category clients is observed, which may correspond to the transition of wireless client device 318 to a high-priority category, while the amount of reserved resources 332 increases accordingly. In this configuration, wireless clients 320 and 322 are illustrated as throttled 348. The amount of free resources 334 is sufficiently above threshold level 338 so that wireless clients 320 and 322 may be throttled to a lesser extent since the amount of resources in use 336 by low-priority category wireless clients can increase slightly.

Figure 4:
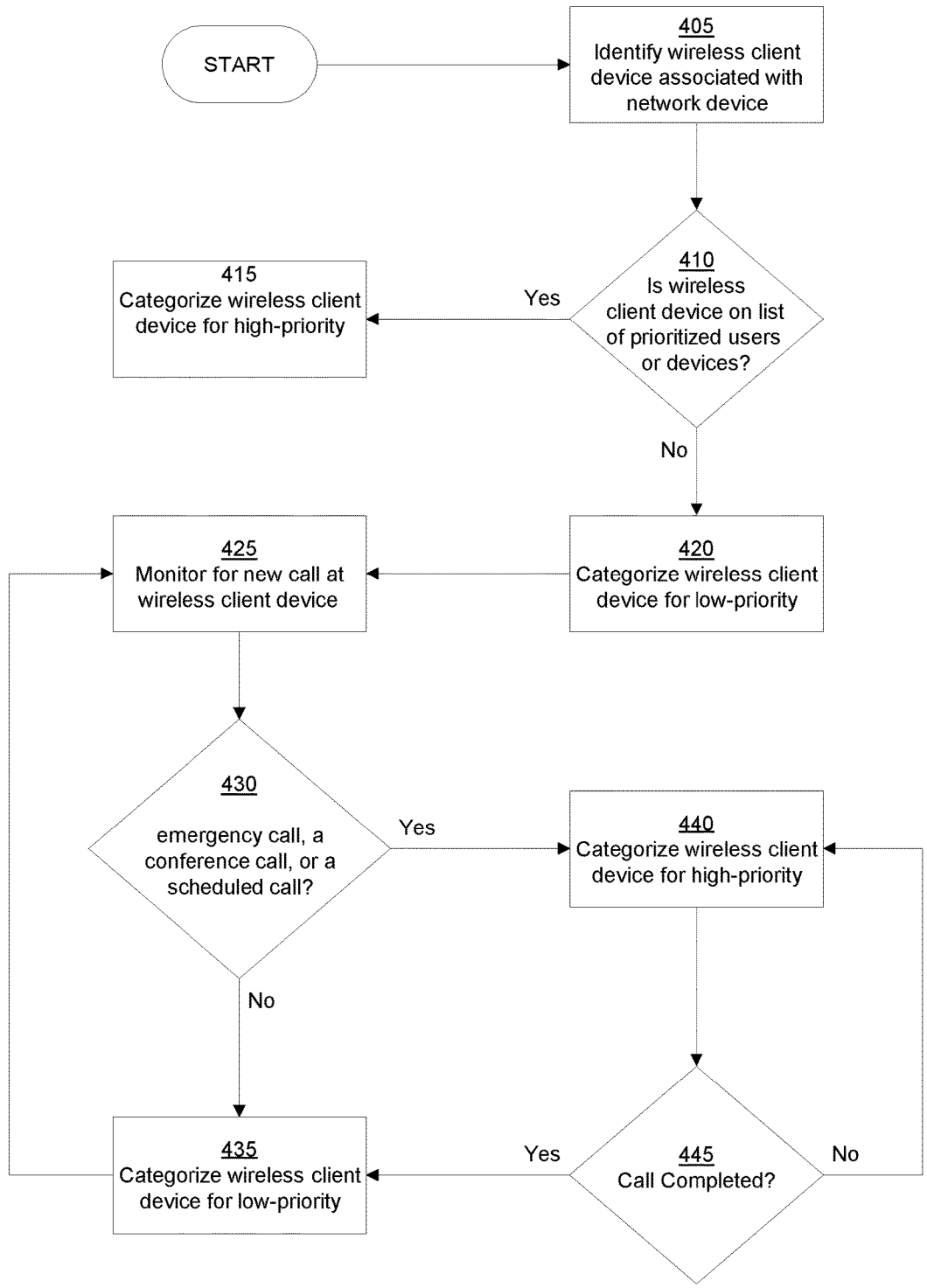
FIG. 4 illustrates an overview of a technique for categorization of a wireless client device in accordance with some embodiments.

FIG. 4 provides an overview of an embodiment for categorizing a wireless client device. At 405, a wireless client device is identified as associated with a network device. At 410, it is determined whether the wireless client device is on or associated with a list of prioritized users or devices, such as by comparing an identifier, such as a device identifier or a user identifier, with a list of identifiers pre-determined as belonging to a high-priority category or a low-priority category. If the wireless client device or user appears on a high-priority list and/or if the device or user does not appear on a low-priority category list, the wireless client device may be categorized as belonging to a high-priority category, at 415. If the wireless client device or user does not appear on a high-priority list and/or if the device or user appears on a low-priority category list, the wireless client device may be categorized as belonging to a low-priority category, at 420. This process may be repeated as necessary for any wireless client device that associates with the network device. In this way, the network device can track the high-priority category devices that may not need to be recategorized because they are automatically categorized as high-priority due to rules based on one or more lists. Similarly, the network device can track the low-priority category devices that may only need to be recategorized when they engage in behavior, such as placing an emergency call, a conference call or a scheduled call.

Alternatively or in addition, wireless clients may be categorized based on a context of their wireless use. This use may be monitored to determine how to categorize the wireless client or how to recharacterize the wireless client when the context of their use changes. For example, a wireless client may be characterized upon association with the network device based on the context of use and then at 425 the network use of the low-priority category may be monitored, such as to determine if a new call is placed. When a new call is placed, at 430, it is determined whether the new call is a call which should automatically be classified as high-priority, based on the context, such as an emergency call, a conference call, or a scheduled call. If the new call is not determined to be high-priority based on the context, the wireless client device is categorized for low-priority, at 435, at which point the network use continues to be monitored for future changes, at 425. If the new call is determined to be high-priority based on the context, the wireless client device is categorized for high-priority, at 440, while the call takes place. At 445, the call is monitored for completion. If the call continues, the wireless client device remains categorized for high-priority. If the call terminates, the wireless client device is recategorized for low-priority at 335 and the network use continues to be monitored for future changes, at 425.

Analysis of network use can be monitored using a variety of techniques known to the skilled artisan, such as deep packet inspection. Alternatively, a device on the network may serve as a gateway for network services, such as voice and video calls, and may determine the type of network use and relay information back to the wireless access point to aid in the categorization. For example, upon determining that a wireless client device is placing an emergency or conference call, a data packet identifying the call as high priority may be sent to the wireless access point.

Other information may be useful for categorizing a new call in a high-priority category. Calendar/schedule information associated with one or more users, rooms within an office such as conference rooms, or one or more devices may be used to determine whether a wireless client device is placing a scheduled call and/or a conference call. Calls which may involve multiple users, such as a conference call, may optionally be pre-determined for high-priority categorization. This information may be retrieved from a digital calendar/schedule, if available.

In some circumstances, conference information may not be available from a calendar/schedule. Other techniques may be useful for determining that a call is a conference call. For example, an access point or voice/video gateway may monitor for identifiers, such as telephone numbers and/or IP addresses, associated with a conference bridge. Upon determining that a call is placed to the conference bridge, the call may automatically result in the wireless client device being recategorized into a high-priority category. Alternatively or additionally, a signal from a voice/video gateway may be received at a wireless access point that indicates that a call to a conference bridge is placed and/or that the call should be classified for high-priority.

Figure 5:
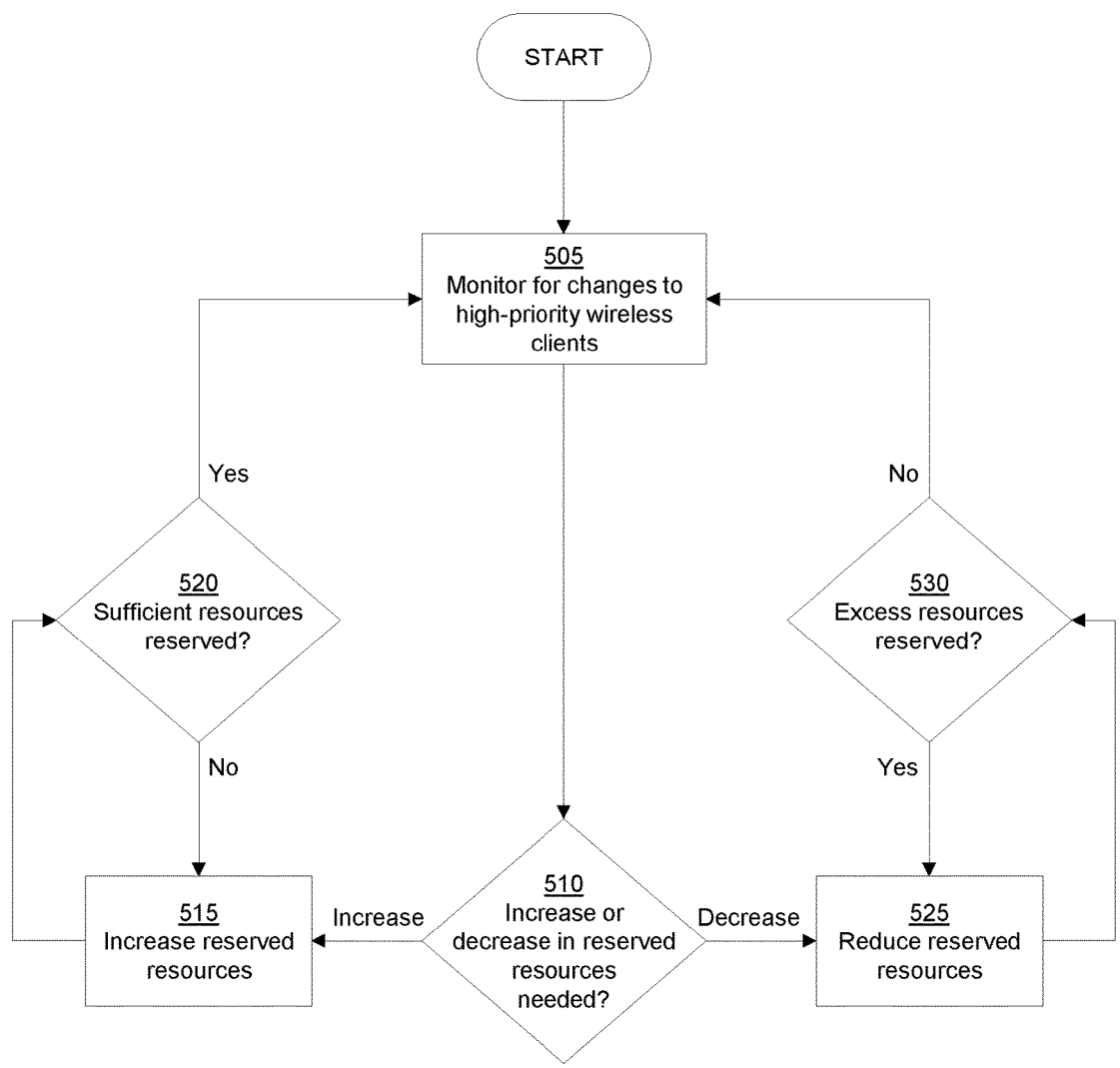
FIG. 5 illustrates an overview of a technique for reservation of wireless resources in accordance with some embodiments.

FIG. 5 provides an overview of an exemplary method in accordance with some embodiments for reservation of resources for high-priority category wireless clients. Initially, at 505, monitoring for changes to high-priority category wireless clients takes place. Such changes may, for example, come about due to an existing high-priority category wireless client becoming associated or disassociated with a wireless access point. Alternatively or additionally, a change may be due to a high-priority category wireless client being recategorized as low priority, such as after a call completes. At 510, it is determined whether an increase or decrease in reserved resources is needed. If no change is needed, the method returns to 505. If an increase in reserved resources is needed, at 515, the amount of reserved resources is increased. At 520, the amount is checked to see whether sufficient resources are reserved. If not, additional resources are reserved. If sufficient resources are reserved, the method returns to 505. If a decrease in reserved resources is needed, at 525, the amount of reserved resources is reduced. At 530, the amount is checked to see whether excess resources are reserved. If not, the method returns to 505. If excess resources are still reserved, the amount of reserved resources is reduced further.

Figure 6:
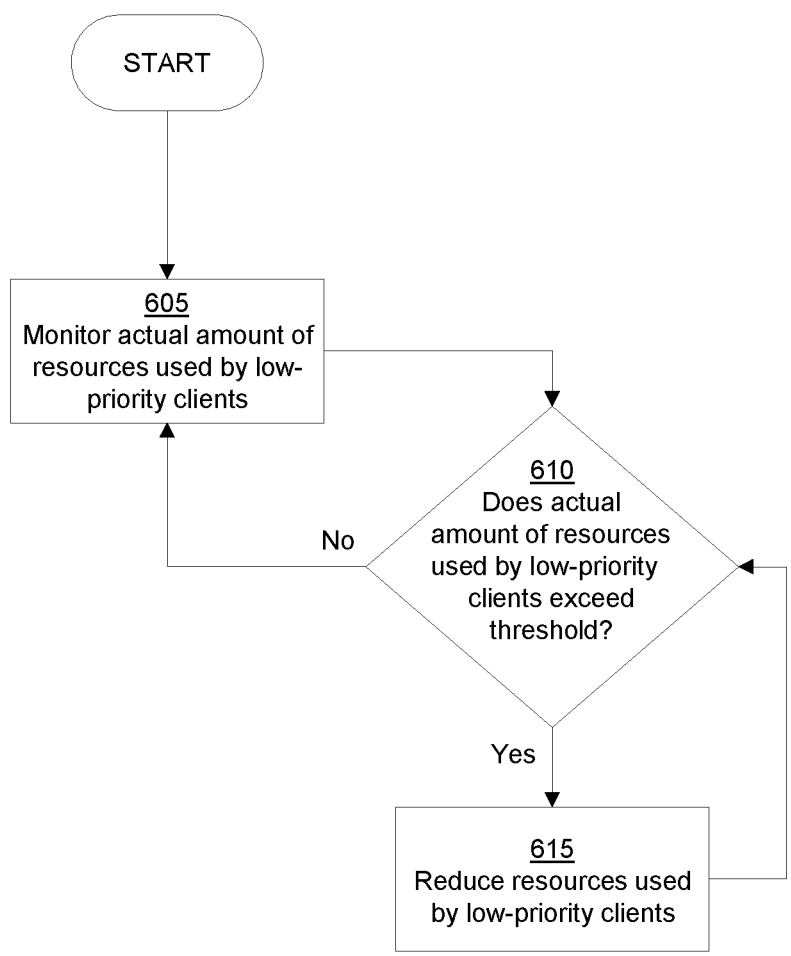
FIG. 6 illustrates an overview of a technique for reducing actual use of wireless resources in accordance with some embodiments.

FIG. 6 provides an overview of an exemplary method in accordance with some embodiments for determining whether an actual amount of wireless resources used by low-priority category wireless client devices needs to be reduced. At 605, the amount of wireless resources actually used by low-priority category wireless client devices is monitored. At 610, the actual amount of wireless resources used by low-priority category wireless client devices is compared with a threshold, such as to determine whether the actual amount exceeds the threshold. If the actual amount in use exceeds the threshold, at 615, the amount of wireless resources used is reduced, such as by using one or more techniques described above. This process is repeated until the amount of wireless resources actually used by low-priority category wireless client devices is reduced to and/or below the threshold amount. Once the amount actually used is compliant with the threshold criteria, the method returns to 605 for additional monitoring of wireless resources actually used by low-priority category wireless client devices.

Figure 7:
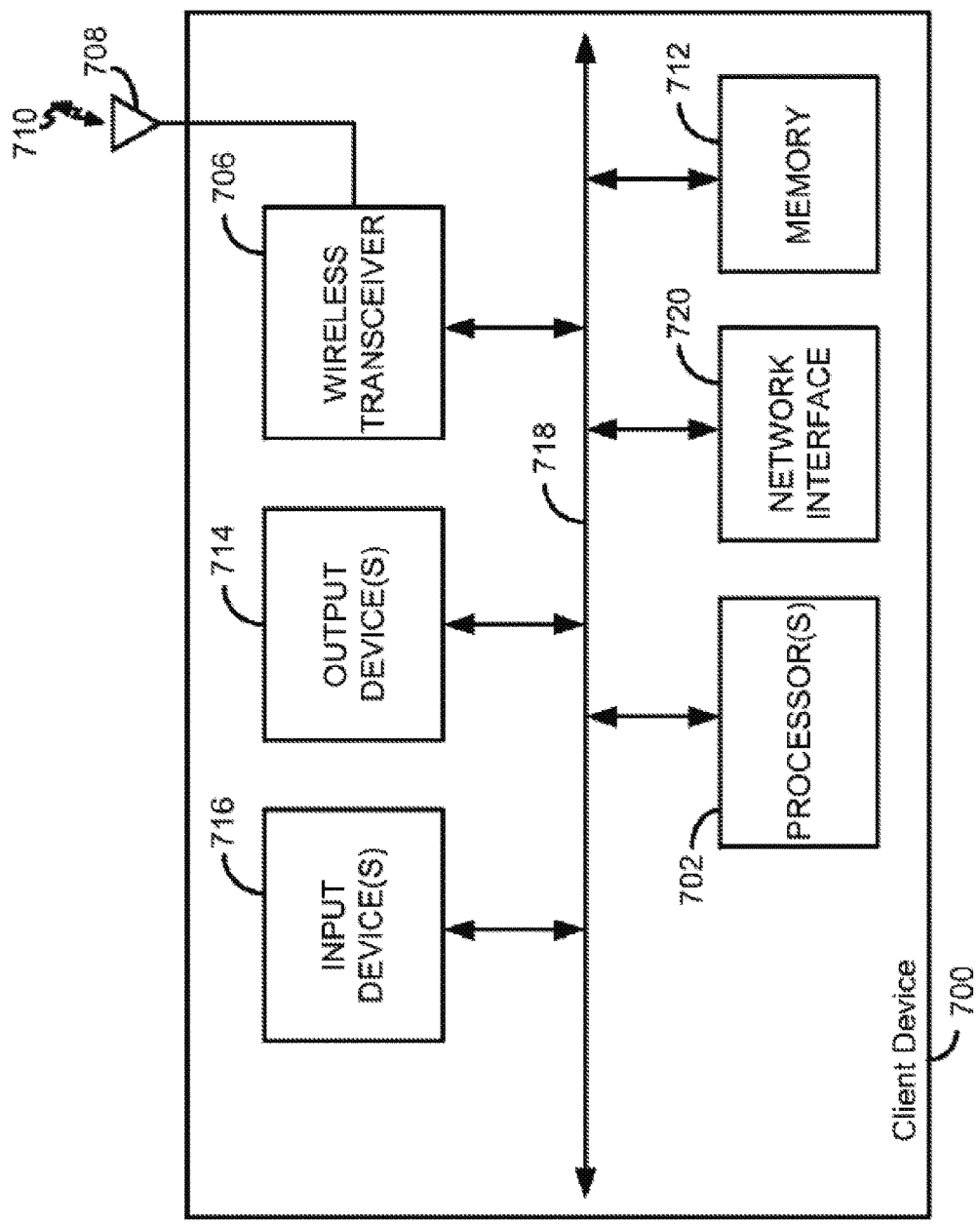
FIG. 7 is a block diagram illustrating an example of a wireless client device in accordance with some embodiments.

FIG. 7 illustrates an example of a client device 700, such as a wireless client device that can connect to a wireless network, for example by association with an access point. Client devices may also be referred to herein as wireless devices, stations, network devices and the like. The client device 700 includes hardware elements that can be electrically coupled via a bus 718 (or may otherwise be in communication, as appropriate). In one embodiment, the bus 718 can be used for the processor(s) 702 to communicate between cores and/or with the memory 712. The hardware elements may include one or more processors 702, including without limitation one or more general-purpose processors and/or one or more special-purpose processors (such as digital signal processing chips, graphics acceleration processors, and/or the like); one or more input devices 716; one or more output devices 714; and one or more wireless transceivers 706. Optionally, input device 716 can include numerous devices including, without limitation, a camera, a mouse, a keyboard, a touch sensitive screen, a touch pad, a keypad, and/or the like. Optionally, output device 714 can include numerous devices including, but not limited to, a display, a printer and/or the like. Client devices optionally include one or more network interfaces 720, such as for network communications over a wired medium, such as a twisted pair cable, a coaxial cable, a fiber optic cable or other network communication cable. For example, network interface 720 may provide for a wired network connection to an IEEE 802.3 compliant Ethernet network.

The client device 700 includes one or more wireless transceivers 706 connected to the bus 718. The wireless transceiver 706 may be operable to transmit and/or receive wireless signals (e.g., signal 710) via one or more antennas 708. A wireless signal 710 received by client device 700 may be transmitted via a wireless device compliant with a wireless communications standard that the client device 700 supports. A wireless signal 710 transmitted by client device 700 may be a wireless signal compliant with a wireless communications standard that the client device 700 supports. For example, embodiments are contemplated where the wireless communications standard is one or more of IEEE 802.11, Bluetooth, Zigbee, UWB, wireless USB, Z-Wave and the like. In an exemplary embodiment, the wireless communications standard is an IEEE 802.11 standard, such as 802.11n or 802.11ac. Wireless transceiver 706 may be configured to transmit and/or receive various radio frequency (RF) signals (e.g., signal 710) via antenna 708 from one or gateways, network devices, access points, other client devices, cellular networks, and/or the like. Client device 700 may also be configured to decode and/or decrypt various signals received.

The client device 700 may further include (and/or be in communication with) one or more non-transitory machine-readable storage mediums or storage devices (e.g., memory 712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 712, such as RAM, ROM, FLASH, or disc drive, and executed by processor(s) 702. The client device 700 can also comprise software elements or functions (e.g., located within the memory 712), including, for example, an operating system, device drivers, executable libraries, and/or other code, such as one or more application programs, which may comprise computer programs implementing various functions. Memory 712 may be a non-transitory machine-readable storage medium, processor-readable memory, and/or a computer-readable memory that stores the one or more computer-program products configured to cause the processor(s) 702 to perform various functions. In other embodiments, various functions described may be performed in hardware.

Figure 8:
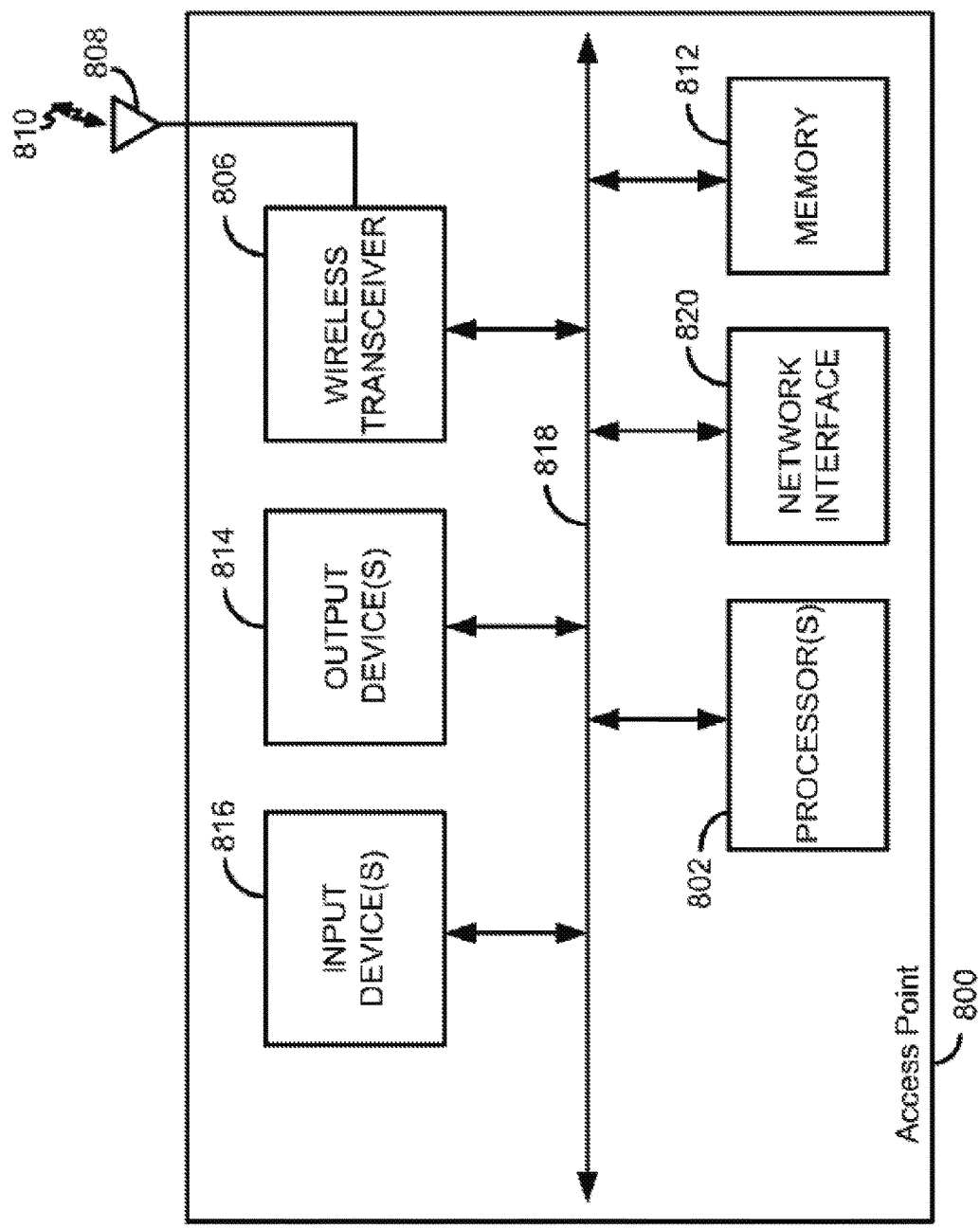
FIG. 8 is a block diagram illustrating an example of an access point in accordance with some embodiments.

FIG. 8 illustrates an example of an access point 800. The access point 800 may optionally include or otherwise function as a range extending device, a router, a gateway, a modem, and/or any other device that provides network access among one or more computing devices and/or networks. For example, access point 800 may include a router gateway with access point and router functionality, and may further include an Ethernet switch and/or a modem. As another example, the access point 800 may include a range extender that may be used to improve signal range and strength within a wireless network by taking an existing signal from another access point and rebroadcasting the signal to create an expanded logical network. Optionally, access point 800 may include or otherwise function as a network controller for configuring and/or managing itself and/or other access points.

The access point 800 includes hardware elements that can be electrically coupled via a bus 818 (or may otherwise be in communication, as appropriate). In one embodiment, the bus 818 can be used for the processor(s) 802 to communicate between cores and/or with the memory 812. The hardware elements may include one or more processors 802, including without limitation one or more general-purpose processors and/or one or more special-purpose processors (such as digital signal processing chips, graphics acceleration processors, and/or the like); one or more input devices 816, which can include without limitation one or more buttons, a keyboard, a keypad, a touch sensitive screen, a touch pad, and/or the like; and one or more output devices 814, which can include, without limitation, a display, light or sound indicators, and/or the like.

The access point 800 may include one or more wireless transceivers 806 connected to the bus 818. The wireless transceiver 806 may be operable to receive and transmit wireless signals (e.g., a wireless signal 810) via an antenna 808. The wireless transceiver 806 may include a transceiver radio designed to transmit and receive signals in compliance with a wireless communications standard. Exemplary wireless communications standards include, but are not limited to, IEEE 802.11 (also referred to herein as WiFi or Wi-Fi), Bluetooth, Zigbee, UWB, wireless USB and Z-Wave. In various embodiments, a wireless communications standard specifies frequency bands, channels, data packet characteristics and other transmission characteristics necessary for inter device-communication. For example, wireless transceiver 806 may include a 2.4 GHz WiFi circuit or a 5 GHz WiFi circuit. Accordingly, the access point 800 may include a single WiFi circuit for a WiFi communications, and a single Bluetooth circuit for Bluetooth communications. In some embodiments, the access point 800 may include multiple wireless transceivers (not shown) for each available communications standard. The antenna 808 may include multiple band antennas that can transmit and/or receive signals over different frequency bands.

The access point 800 may further include a radio frequency (RF) circuit. In some embodiments, the wireless transceiver 806 may be integrated with or coupled to the RF circuit so that the RF circuit includes the wireless transceiver 806. In some embodiments, the wireless transceiver 806 and the RF circuit are separate components. The RF circuit may include a RF amplifier that may amplify signals received over antenna 808. The RF circuit may also include a power controller that may be used to adjust signal amplification by the RF amplifier. The power controller may be implemented using hardware, firmware, software, or any combination thereof.

The wireless signal 810 may be transmitted via a wireless communication channel. In some embodiments, the wireless communication channel may be any wireless communication channel established between two or more devices, such as a wireless local area network (e.g., a WiFi network), a Personal Access Network (e.g., between Bluetooth, Zigbee, UWB or wireless USB compatible devices), or a cellular network (e.g., a GSM, WCDMA, LTE, CDMA2000 network). The wireless transceiver 806 may be configured to receive various radio frequency (RF) signals (e.g., signal 810) via antenna 808, respectively, from one or more other access points, network devices, beacons and/or the like. Access point 800 may also be configured to decode and/or decrypt various signals received from one or more access points, network devices, wireless client devices, and/or the like.

The access point 800 may include a power supply (not shown) that can power the various components. The power supply may include a switched-mode power supply, a linear power supply, a push-pull power supply, or any other suitable type of power supply. In some embodiments, the access point 800 may include multiple power supplies. For example, a switched-mode power supply may be used to condition input power, and a linear power supply may be used to power the RF circuit. The power supply may be configured to operate over various ranges of appropriate input voltages.

Alternatively, the access point 800 may include circuitry for receiving voltage, current or power via an external power supply or a Power over Ethernet connection. Power over Ethernet support is optionally provided by network interface 820. Network interface 820 can provide for network connections to external devices via any standardized or specialized network connection, such as IEEE 802.3. In an exemplary embodiment, network interface 820 provides support for a wired Ethernet connection to a network. Other wired network technologies are contemplated for connection to networks, as will be understood by the skilled artisan; however, due to its ubiquitous nature and support for Power over Ethernet, wired Ethernet over twisted pairs may be preferentially employed.

The access point 800 may further include (and/or be in communication with) one or more non-transitory machine-readable storage mediums or storage devices (e.g., memory 812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 812, such as RAM, ROM, FLASH, or disc drive, and executed by processor(s) 802. The access point 800 can also comprise software elements (e.g., located within the memory 812), including, for example, an operating system, device drivers, executable libraries, and/or other code, such as one or more application programs, which may comprise computer programs implementing the functions provided by various embodiments, and/or may be designed to implement methods and/or configure systems, as described herein.

Figure 9:
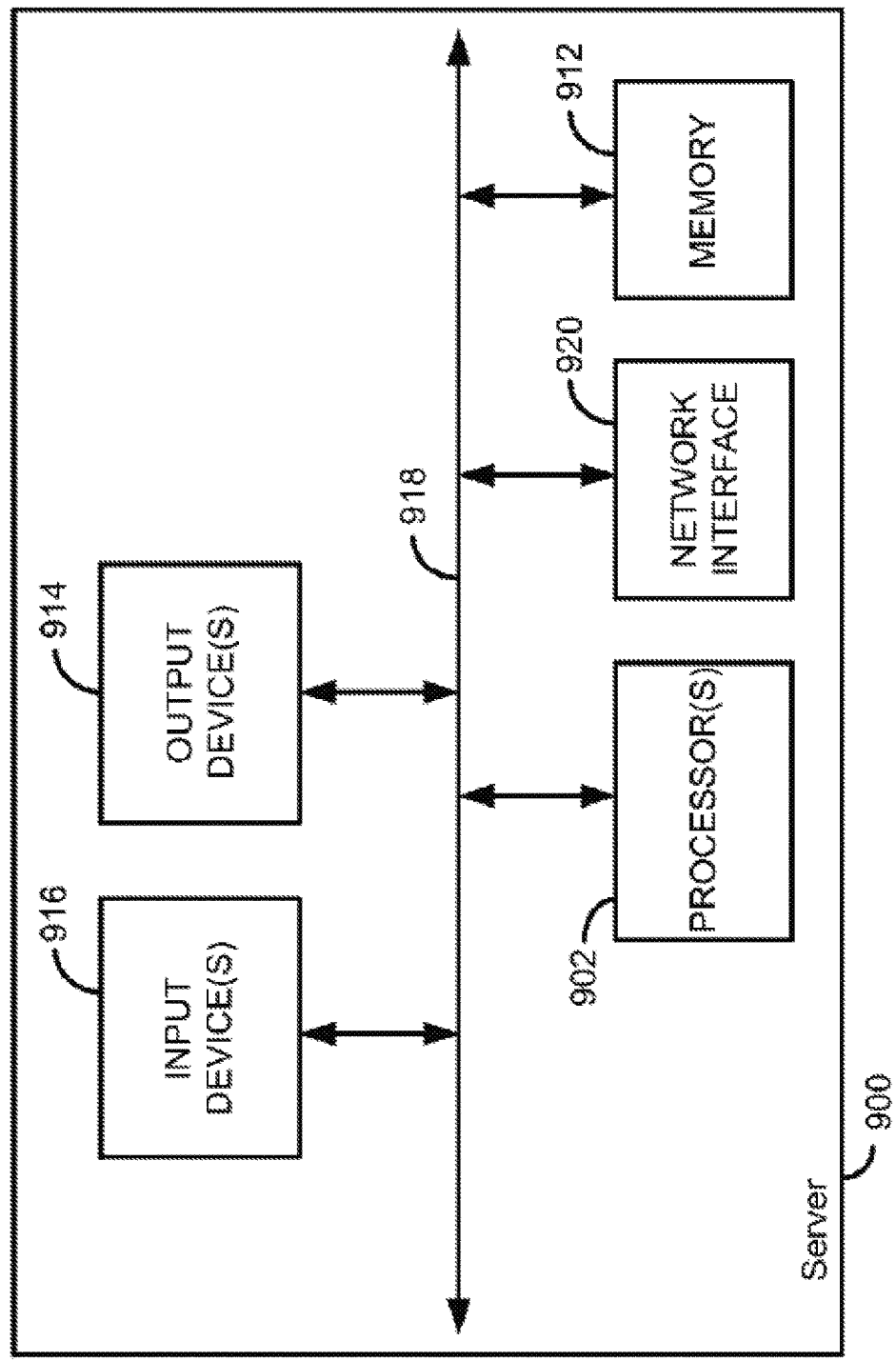
FIG. 9 is a block diagram illustrating an example of a server in accordance with some embodiments.

FIG. 9 illustrates an example of a server 900. In various embodiments, server 900 may communicate with other devices such as using one or more wireless or wired data networks. Server 900 may provide network services and/or may be used to control and/or manage one or more wireless devices, such as one or more wireless access points. The server 900 includes hardware elements that can be electrically coupled via a bus 918 (or may otherwise be in communication, as appropriate). In one embodiment, the bus 918 can be used for the processor(s) 902 to communicate between cores and/or with the memory 912. The hardware elements may include one or more processors 902, including without limitation one or more general-purpose processors and/or one or more special-purpose processors (such as digital signal processing chips, graphics acceleration processors, and/or the like), memory 912, output devices 914, input devices 916, a bus 918 and a network interface 920. Furthermore, in addition to the network interface 920, server 900 can optionally further include a wireless transceiver to communicate with a network (e.g., a wireless local area network, a wireless network of a preferred carrier, Internet, etc.).

The server 900 may further include (and/or be in communication with) one or more non-transitory machine-readable storage mediums or storage devices (e.g., memory 912), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 912. The server 900 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the aspects of methods described herein, such as centralized management and control over wireless access points, beacons, etc. The memory 912 may be a non-transitory machine-readable storage medium, processor-readable memory, and/or a computer-readable memory that stores the one or more computer-program products configured to cause the processor(s) 902 to perform the functions described. In other embodiments, one or more of the functions described may be performed in hardware.

A set of these instructions and/or code is optionally stored on a non-transitory machine-readable storage medium, such as the memory 912. In some cases, the storage medium is optionally incorporated within a computer system. In other embodiments, the storage medium is optionally separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 900 and/or may take the form of source and/or installable code, which, upon compilation and/or installation on the server 900 (e.g., using any of a variety of generally available compilers, installation programs, compression/decompression utilities, etc.) then takes the form of executable code.

Merely by way of example, one or more procedures described with respect to the processes or methods discussed above, for example as described with respect to FIGS. 4-6 or any portion thereof, may be implemented as code and/or instructions executable by a computer or device (and/or a processor within a computer or device); in an aspect, then, such code and/or instructions can be used to configure and/or adapt a general purpose computer (or other device) to perform one or more operations in accordance with the described methods. Such functions or code may include code to perform the steps described above with respect to FIGS. 4-6 or portions thereof. The memory may be a non-transitory machine-readable storage medium, processor-readable memory, and/or a computer-readable memory that stores the one or more computer-program products configured to cause the processor(s) to perform the functions described. In other embodiments, one or more of the functions described may be performed in hardware.

Aspects of the disclosed methods, when performed by a general purpose computer, allow the general purpose computer to perform more efficiently, such as by performing an operation in fewer steps or using less memory or processing time, than prior methods. Further, performance of aspects of the disclosed methods by a general purpose computer may transform the general purpose computer into a special purpose computer, such as a network device, a wireless access point, a wireless client, etc. Aspects of the disclosed methods, when performed by a general purpose computer, further allow the general purpose computer to perform new functions and/or to perform functions in new ways, such as in more useful orders. For example, aspects of the disclosed methods achieve simplified and/or more efficient operation of network devices, such as client devices and wireless access point, as well as efficiency gains in operation of wireless networking and use of the radio frequency medium.

A set of these instructions and/or code might be stored on a non-transitory machine-readable storage medium, such as the memory. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by a computer or device and/or might take the form of source and/or installable code, which, upon compilation and/or installation on the computer or device (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A system, comprising:
one or more processors;
a network transceiver coupled to the one or more processors; and
a non-transitory computer readable storage medium coupled to the one or more processors, wherein the non-transitory computer readable storage medium includes instructions that, when executed by the one or more processors, cause the one or more processors to perform operations including:
categorizing, by a network device, a wireless client device into a category, wherein:
categories are associated with priorities including high priorities and low priorities;
the wireless client device is categorized as high priority for a duration of a wireless call; and
the high priority wireless client device is recategorized as low priority in response to the wireless call being terminated;
determining a reserve amount of wireless resources to reserve for wireless calls placed by wireless client devices in a high-priority category, wherein the reserve amount of wireless resources includes an amount of wireless resources needed for all wireless client devices in the high-priority category to place wireless calls;
determining a threshold amount of wireless resources available for use by wireless client devices in a low-priority category, wherein the threshold amount is determined using the reserve amount;
monitoring an actual amount of wireless resources used by wireless client devices in the low-priority category;
determining that the actual amount exceeds the threshold amount; and
reducing the actual amount of wireless resources used by wireless client devices in the low-priority category to below the threshold amount.

2. The system of claim 1, wherein categorizing includes analyzing a context associated with the wireless client device.

3. The system of claim 1, wherein categorizing includes identifying that the wireless client device is associated with an identity or a group pre-established as belonging to the high-priority category.

4. The system of claim 1, wherein categorizing includes comparing an identifier for the wireless client device with a list of identifiers pre-established as belonging to the high-priority category.

5. The system of claim 1, wherein categorizing includes identifying that the wireless client device is placing a wireless emergency call.

6. The system of claim 1, wherein categorizing includes identifying that the wireless client device is placing a wireless conference call.

7. The system of claim 1, wherein categorizing includes identifying that the wireless client device is placing a pre-scheduled wireless call.

8. The system of claim 1, wherein wireless client devices in the high-priority category correspond to high-priority wireless voice client or high-priority wireless video clients, and wherein wireless client devices in the low-priority category correspond to low-priority wireless voice clients, low-priority wireless video clients, or low-priority wireless data clients.

9. The system of claim 1, wherein reducing includes limiting a data rate of a low-priority category wireless client device.

10. The system of claim 1, wherein reducing includes limiting a bandwidth of a low-priority category wireless client device.

11. The system of claim 1, wherein reducing includes facilitating a handoff of a low-priority category wireless client device.

12. The system of claim 1, wherein reducing includes facilitating a fast basic service set transition of a low-priority category wireless client device.

13. The system of claim 1, wherein reducing includes transmitting a basic service set transition management request.

14. The system of claim 1, wherein reducing includes transmitting a basic service set transition management request, and wherein receiving the basic service set transition management request at a low-priority category wireless client device facilitates a handoff of the low-priority category wireless client device.

15. The system of claim 1, wherein reducing includes transmitting a list of neighboring network devices, wherein neighboring network devices of the list correspond to additional network devices in wireless communication range of the network device.

16. The system of claim 1, wherein reducing includes disassociating a low-priority category wireless client device.

17. The system of claim 1, wherein reducing includes transmitting a request that a low-priority category wireless client device transfer data transmissions to an alternative network connection.

18. The system of claim 1, wherein determining the reserve amount of wireless resources includes identifying an amount of wireless resources for a wireless voice call or a wireless video call.

19. A computer implemented method, comprising:
categorizing, by a network device, a wireless client device associated with the network device into a category, wherein:
    categories are associated with priorities including high priorities and low priorities;
    the wireless client device is categorized as high priority for a duration of a wireless call; and
    the high priority wireless client device is recategorized as low priority in response to the wireless call being terminated;
determining a reserve amount of wireless resources to reserve for wireless calls placed by wireless client devices in a high-priority category, wherein the reserve amount of wireless resources includes an amount of wireless resources needed for all wireless client devices in the high-priority category to place wireless calls;
determining a threshold amount of wireless resources available for use by wireless client devices in a low-priority category, wherein the threshold amount is determined using the reserve amount;
monitoring an actual amount of wireless resources used by wireless client devices in the low-priority category;
determining that the actual amount exceeds the threshold amount; and
reducing the actual amount of wireless resources used by wireless client devices in the low-priority category to below the threshold amount.

20. A non-transitory computer readable medium comprising instructions that, when executed by one or more processors, cause the one or more processors to perform operations including:
categorizing, by a network device, a wireless client device into a category, wherein:
    categories are associated with priorities including high priorities and low priorities;
    the wireless client device is categorized as high priority for a duration of a wireless call; and
    the high priority wireless client device is recategorized as low priority in response to the wireless call being terminated;
determining a reserve amount of wireless resources to reserve for wireless calls placed by wireless client devices in a high-priority category, wherein the reserve amount of wireless resources includes an amount of wireless resources needed for all wireless client devices in the high-priority category to place wireless calls;
determining a threshold amount of wireless resources available for use by wireless client devices in a low-priority category, wherein the threshold amount is determined using the reserve amount;
monitoring an actual amount of wireless resources used by wireless client devices in the low-priority category;
determining that the actual amount exceeds the threshold amount; and
reducing the actual amount of wireless resources used by wireless client devices in the low-priority category to below the threshold amount.

* * * * *